(12) United States Patent
Adjeleian

(10) Patent No.: US 10,913,593 B2
(45) Date of Patent: Feb. 9, 2021

(54) MAGNETIC OBJECT HOLDER

(71) Applicant: 3849953 Canada Inc., Kemptville (CA)

(72) Inventor: Michael Adjeleian, Kemptville (CA)

(73) Assignee: 3849953 Canada Inc., Kemptville (CA)

( * ) Notice: Subject to any disclaimer, the term of this patent is extended or adjusted under 35 U.S.C. 154(b) by 0 days.

(21) Appl. No.: 16/671,959

(22) Filed: Nov. 1, 2019

(65) Prior Publication Data

US 2020/0140182 A1 May 7, 2020

Related U.S. Application Data

(63) Continuation of application No. 16/179,501, filed on Nov. 2, 2018.

(51) Int. Cl.
*B65D 81/38* (2006.01)
*B65D 23/08* (2006.01)

(52) U.S. Cl.
CPC ..... *B65D 81/3886* (2013.01); *B65D 23/0842* (2013.01)

(58) Field of Classification Search
CPC ............ B65D 81/3876; B65D 81/3879; B65D 81/3881; B65D 81/3886; B65D 23/0842; A47G 2023/275; A47G 2023/0291; A47G 2023/0216; A47G 23/0241
See application file for complete search history.

(56) References Cited

U.S. PATENT DOCUMENTS

| | | | |
|---|---|---|---|
| 4,197,890 A | 4/1980 | Simko | |
| 5,206,070 A | 4/1993 | Haibach et al. | |
| 5,791,608 A | 8/1998 | Nielsen et al. | |
| 6,390,319 B1 | 5/2002 | Yu | |
| 7,021,594 B2* | 4/2006 | Exler | A47G 23/0225 248/205.2 |
| D547,618 S | 7/2007 | Exler | |
| 7,897,088 B2 | 3/2011 | Mitchell | |
| 8,001,671 B2* | 8/2011 | Mitchell | A47G 23/0225 220/737 |
| 9,333,641 B2 | 5/2016 | Macias | |
| 9,578,954 B2 | 2/2017 | Sellars | |
| 10,499,756 B2* | 12/2019 | Paige | A47G 23/0225 |

(Continued)

FOREIGN PATENT DOCUMENTS

AU 2011101738 4/2014

OTHER PUBLICATIONS

A. Kwiecien, "Stiff and flexible adhesive bonding CFRP to masonry substrates—Investigated in pull-off test and single-lap test", Science Direct, Online Article, Jun. 2012, http://www.sciencedirect.com/science/article/pii/S1644966512000167.

(Continued)

*Primary Examiner* — Don M Anderson
(74) *Attorney, Agent, or Firm* — Eric B. Fugett; Mark A. Pitchford; Pitchford Fugett, PLLC

(57) ABSTRACT

A magnetic object holder is a device for releasably attaching an object to a ferromagnetic surface. The device can include an insulated flexible sleeve defining an interior space in which the object is removably receivable. The sleeve grips the object in an interference fit when the object is received in the interior space. One or more magnets secured to a portion of the sleeve enables the sleeve to be releasably attached to the ferromagnetic surface while the object is received in the interior space.

22 Claims, 19 Drawing Sheets

(56) References Cited

U.S. PATENT DOCUMENTS

| | | |
|---|---|---|
| 2004/0084593 A1 | 5/2004 | Barfield |
| 2004/0104320 A1 | 6/2004 | Exler |
| 2004/0173719 A1 | 9/2004 | Mitchell |
| 2005/0006547 A1 | 1/2005 | Exler |
| 2005/0056646 A1 | 3/2005 | Gary |
| 2005/0056655 A1 | 3/2005 | Gary |
| 2006/0273573 A1 | 12/2006 | Wittmeyer, Jr. |
| 2007/0017924 A1 | 1/2007 | Hundley |
| 2007/0176069 A1 | 8/2007 | Mitchell |
| 2007/0176070 A1 | 8/2007 | Mitchell |
| 2007/0254129 A1 | 11/2007 | Horblitt |
| 2008/0164269 A1* | 7/2008 | Vorderkunz ....... B65D 81/3876 220/739 |
| 2012/0291174 A1 | 11/2012 | Lee |
| 2014/0339240 A1 | 11/2014 | Moore |
| 2014/0339244 A1 | 11/2014 | Arnold |
| 2015/0265083 A1* | 9/2015 | Myers ................ A47G 23/0216 220/739 |
| 2016/0270575 A1 | 9/2016 | Panone |
| 2017/0303599 A1 | 10/2017 | Madine |
| 2018/0008072 A1* | 1/2018 | Paige ................ A47G 23/0225 |

OTHER PUBLICATIONS

R.J. Koopmans, E.F. Vansant, R. Van Der Linden, "The characterisation of newly hydrolyzed ethylene vinyl acetate copolymers", the Journal of Adhesion, vol. 11, Issue 3, Online Article, Feb. 24, 2007, http://tandfonline.com/doi/abs/10.1080/00218468008078916.
International Search Report & Written Opinion in PCTIB2019059418 dated Feb. 5, 2020.

* cited by examiner

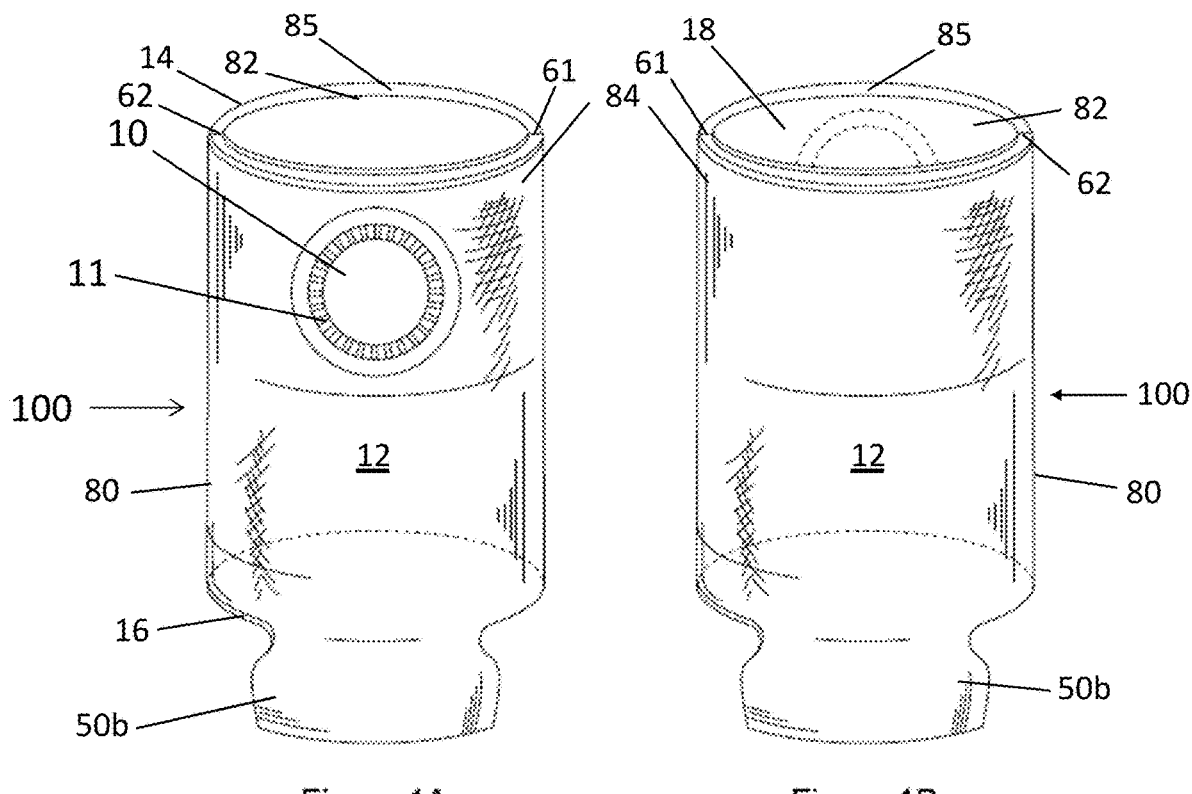
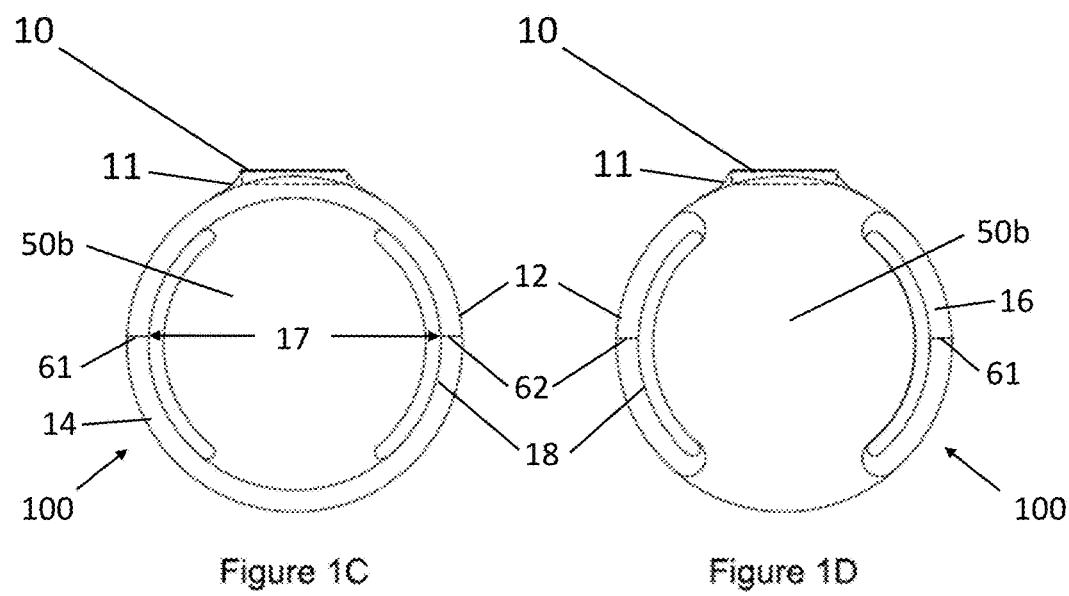
Figure 1A   Figure 1B
Figure 1C   Figure 1D

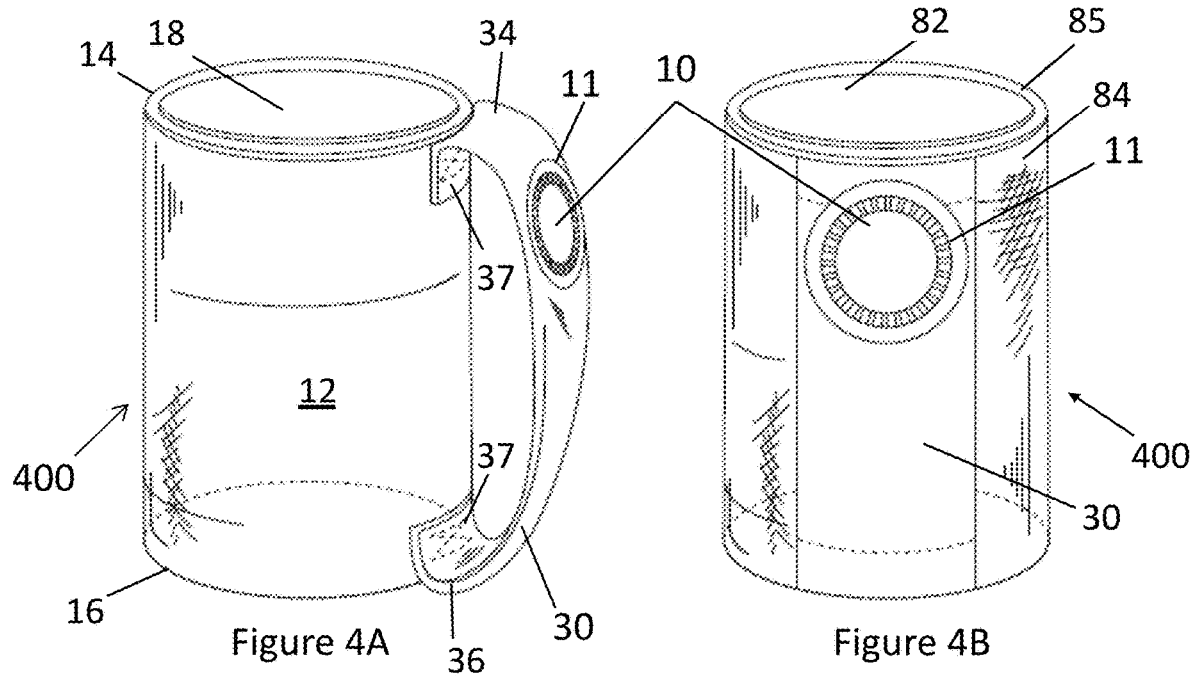
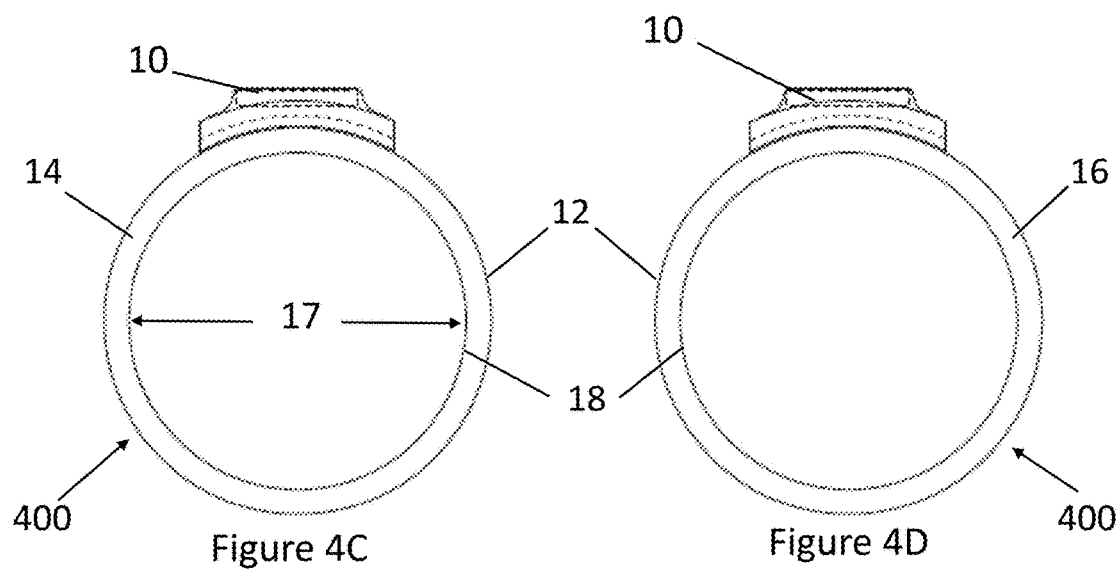
Figure 4A Figure 4B
Figure 4C Figure 4D

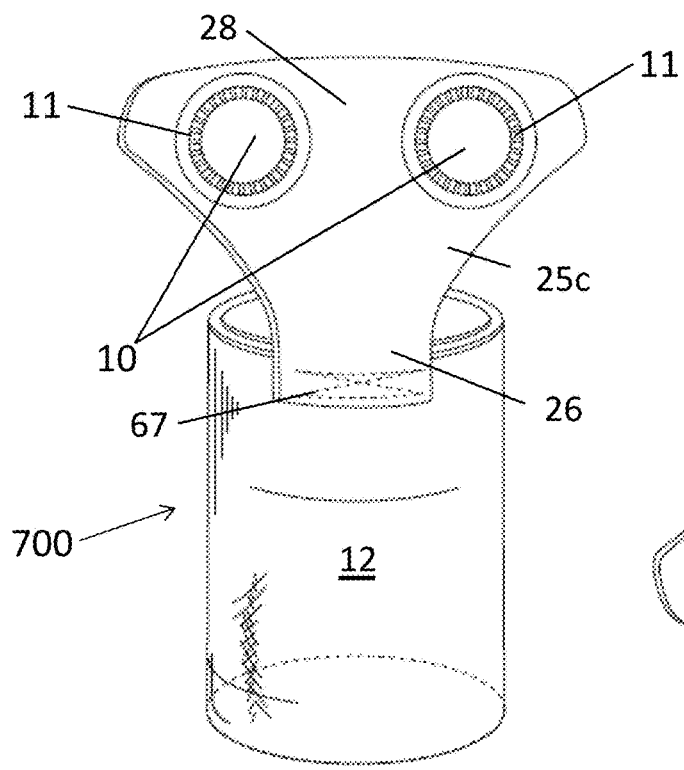
Figure 7A
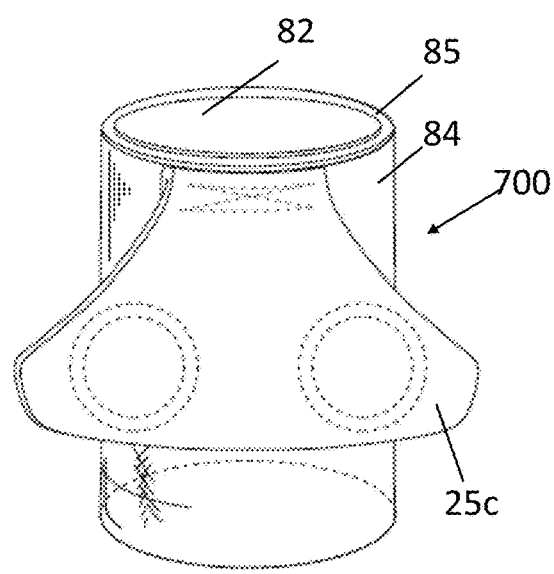
Figure 7B
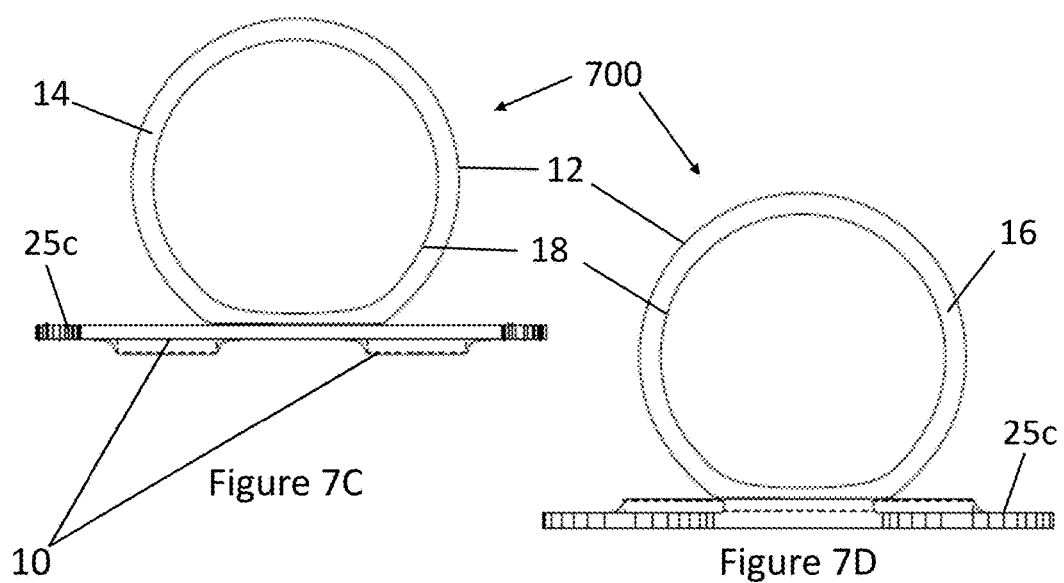
Figure 7C
Figure 7D

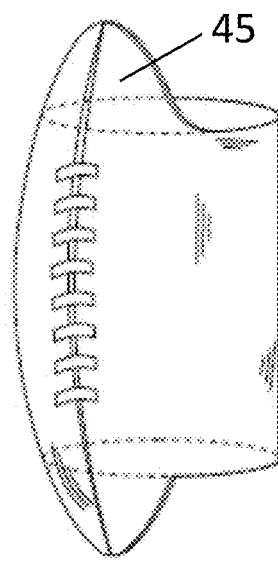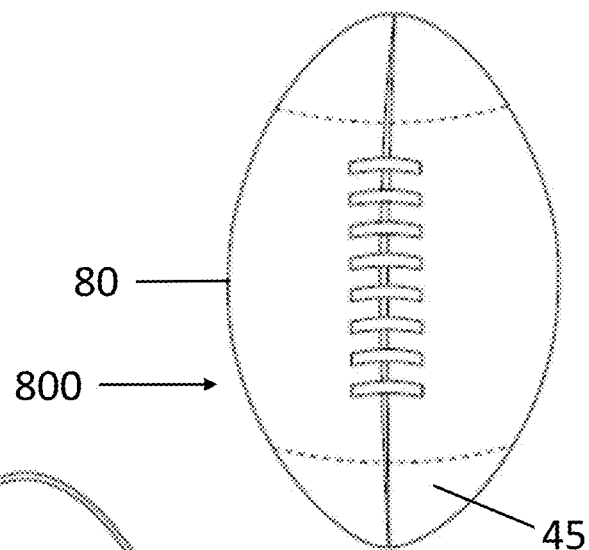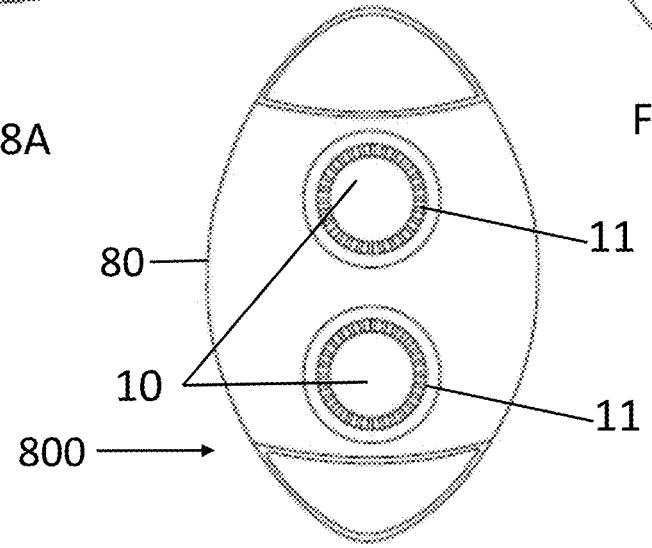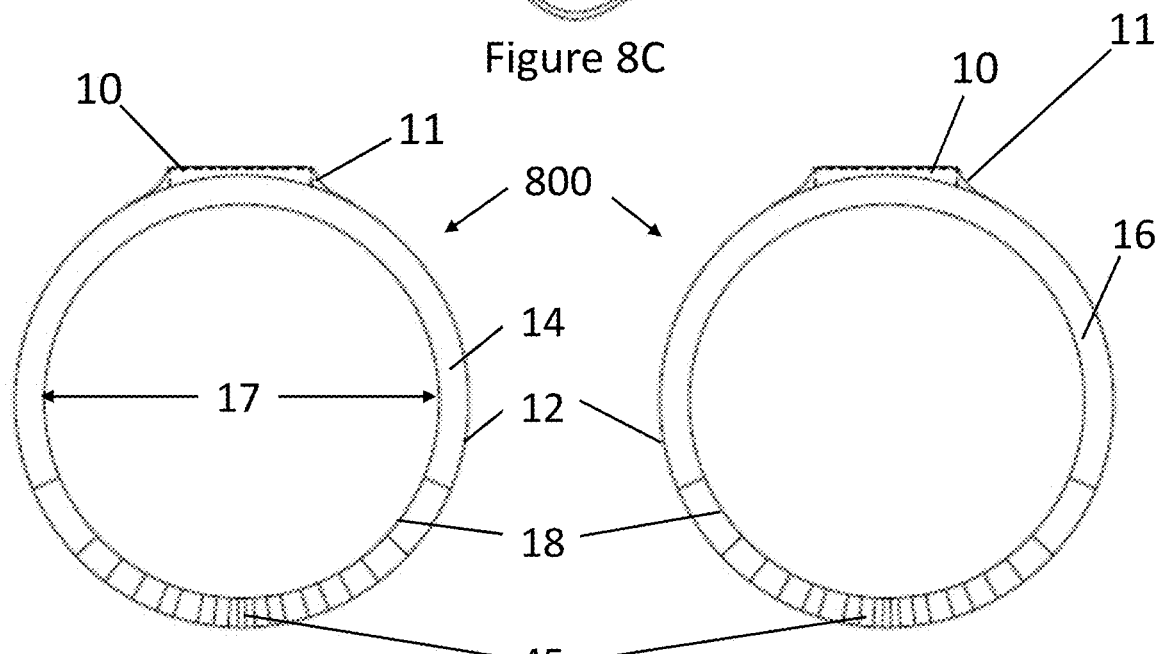
Figure 8A
Figure 8B
Figure 8C
Figure 8D
Figure 8E Figure 13A
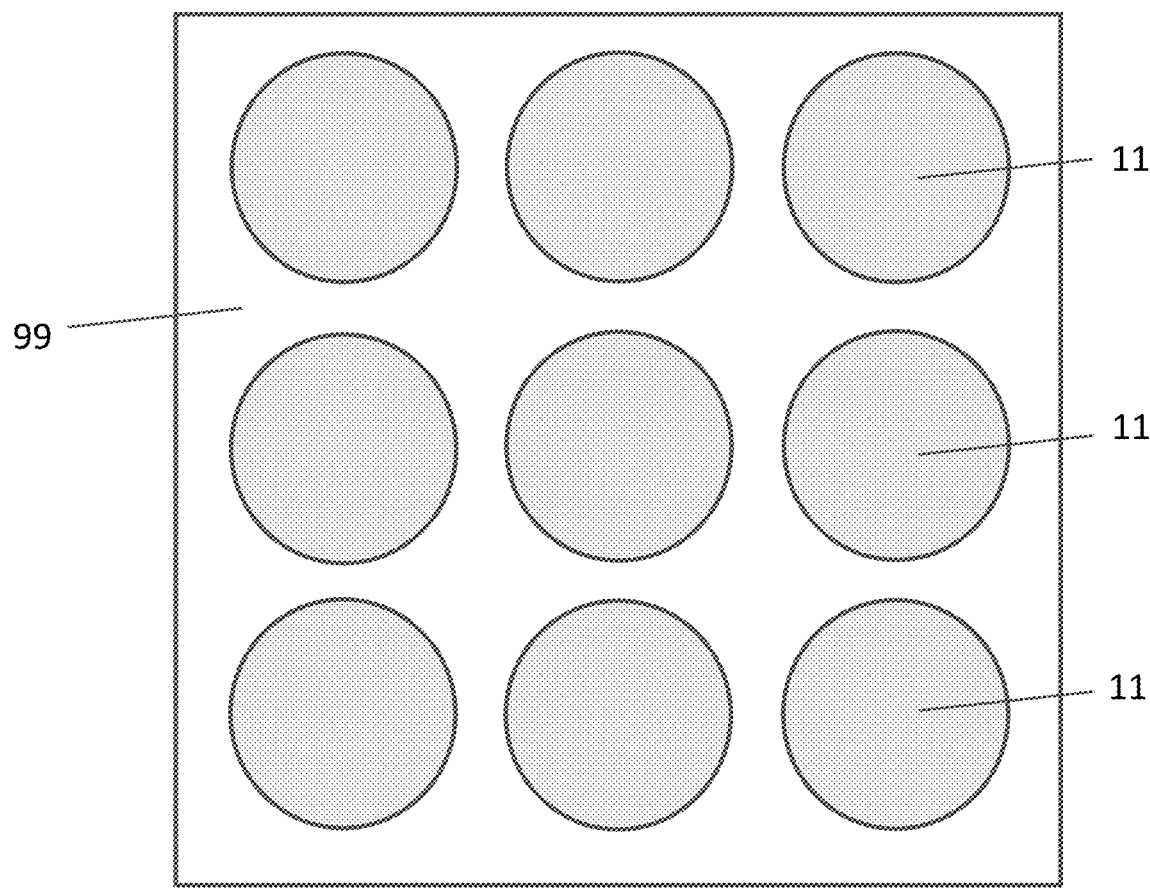
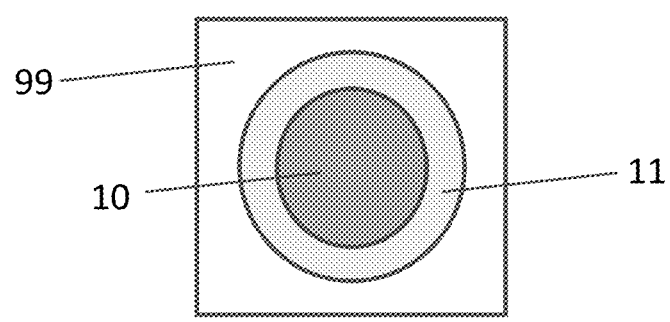
Figure 13B

MAGNETIC OBJECT HOLDER

CROSS-REFERENCES TO RELATED APPLICATIONS

This application is a continuation of pending U.S. patent application Ser. No. 16/179,501, filed Nov. 2, 2018 and titled "Insulated Magnetic Beverage Holder," the entirety of which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable.

BACKGROUND OF THE INVENTION

The present disclosure relates generally to devices for holding an object, and more particularly, to holders for beverage containers and other items.

People consume beverages from portable beverage containers every day in diverse settings all around the world. Some of the most common and widely used portable beverage containers include mass produced aluminum cans, as well as bottles of different shapes and sizes made from plastic, glass, or aluminum. Although the exact silhouette of these containers can vary, they tend to have an overall shape that is generally cylindrical or include a generally cylindrical portion sized to allow a user to grasp the container in one hand.

Open beverage containers must generally be stored upright on a flat stable surface or in a cupholder to prevent a beverage contained therein from spilling. However, flat surfaces and cupholders are not always available in all settings in which a user may desire to consume the beverage, including when a user is aboard a watercraft or other vehicle. It can also be undesirable to rest a beverage container on the ground or floor (even where suitably flat) in areas where small children or animals are present, or in areas that have high foot traffic, because a container so placed could become inadvertently knocked over or pose a tripping hazard. Thus, it can be desirable to secure the beverage container to a nearby surface while retaining the ability to lift the container for the purpose of drinking from it. It can also be desirable to insulate a chilled beverage from warming by ambient air, sunlight, and contact with a user's skin in order to both maintain the beverage at a given temperature and protect the user's hand from beverage containers which may be uncomfortably hot, cold, or wet.

Numerous beverage container holders have been developed that attempt but fail to accomplish these purposes. For example, beverage holders sold in the United States under the KOOZIE® brand have been used to insulate and reduce slippage of beverage containers on flat surfaces. Such holders are typically constructed of polystyrene foam or neoprene and are configured to essentially surround the beverage container. They also often have a non-slip surface intended to decrease the likelihood of slippage. In addition, a base of increased diameter may serve to somewhat increase the stability of the container against tipping. However, because there is necessarily a thickness associated with the base portion, such devices serve to raise the center of gravity of the beverage container, making them unstable even on flat surfaces and thereby increasing the likelihood of spillage in the absence of a cup holder.

U.S. Pat. No. 7,021,594 discloses a folding magnetic holding wrap for cups or mugs. The wrap device disclosed therein consists essential of an initially flat, elongated strip of flexible material having releasable hook and loop fasteners secured to opposite surfaces of each of its two opposing ends. The releasable fasteners are configured to engage each other when the device is wrapped around a cup with the ends overlapping. A magnet centrally affixed to the wrap element between the sides and opposing ends permits the device to be mounted on a metal support while holding a cup. However, the wrap device disclosed in U.S. Pat. No. 7,021,594 can fail to grip and inadvertently release the cup if the ends of the wrap are not properly engaged by the user or if the releasable fasteners become disengaged due to the overlapping ends of the wrap snagging on the user's clothes or environment.

Accordingly, what is needed are improvements in devices for holding beverage containers and other objects, as well as methods for forming such devices.

BRIEF SUMMARY

Aspects of the present invention overcome or minimize some or all of the foregoing problems by providing a device for releasably securing a wide variety of objects, including but not limited to beverage containers such as bottles and cans, to a ferromagnetic surface using magnetism. Generally, the device includes an insulated flexible sleeve having a tubular body with one or two open ends in which an object is removably receivable. The body of the sleeve is configured to stretch around and releasably grip an object inserted therein in an interference fit without the need for unreliable releasable fasteners, which can fail or become inadvertently disengaged. One or more magnets secured to the tubular body enable the sleeve to be releasable secured to any ferromagnetic surface, regardless of the orientation of the surface. The device is used by inserting an object into an open end of the sleeve, the interior surface of which forms an interference fit with the exterior surface of the object. The sleeve gripping an object can then be placed adjacent a ferromagnetic surface to releasably attach the object to the surface until the sleeve and the object received therein is lifted from the surface.

Accordingly, in one aspect, a magnetic object holder is a device for releasably attaching an object to a ferromagnetic surface. The device can include an insulated flexible sleeve defining an interior space in which the object is removably receivable. The sleeve grips the object in an interference fit when the object is received in the interior space. One or more magnets secured to a portion of the sleeve enables the sleeve to be releasably attached to the ferromagnetic surface while the object is received in the interior space.

In another aspect, insulated magnetic container holder is a device for releasably attaching an object to a ferromagnetic surface, the device including a sheet of flexible material having two opposing ends secured together along a seam to form a tubular sleeve in which at least a portion of the object is removably receivable, at least one magnet secured to the sleeve, and at least one patch fused to the sleeve around the perimeter of the at least one magnet. The sleeve has an interior diameter that is less than an exterior diameter of the object such that the sleeve releasably engages the object in an interference fit when the object is received in the sleeve.

In yet another aspect, a method for forming a device for releasably attaching an object to a ferromagnetic surface includes providing a magnet, a patch formed from a heat-activated adhesive material, and a flexible sleeve in which the object is removably receivable. The magnet is positioned between a portion of the flexible sleeve and the patch so that a periphery of the patch extends beyond a perimeter of the magnet. Heat and pressure are then applied to the patch to fuse the patch to the flexible sleeve around the perimeter of the magnet.

Numerous other objects, advantages and features of the present disclosure will be readily apparent to those of skill in the art upon a review of the following drawings and description of a preferred embodiment.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various drawings unless otherwise specified. In the drawings, not all reference numbers are included in each drawing, for the sake of clarity.

FIG. 1A is an elevated front perspective view of a magnetic object holder constructed in accordance with one embodiment of the present invention.

FIG. 1B is an elevated rear perspective view of the magnetic object holder of FIG. 1A.

FIG. 1C is a top plan view of the magnetic object holder of FIG. 1A.

FIG. 1D is bottom plan view of the magnetic object holder of FIG. 1A.

FIG. 4A is an elevated side perspective view of a magnetic object holder constructed in accordance with another embodiment of the present invention.

FIG. 4B is an elevated rear perspective view of the magnetic object holder of FIG. 4A.

FIG. 4C is a top plan view of the magnetic object holder of FIG. 4A.

FIG. 4D is bottom plan view of the magnetic object holder of FIG. 4A.

FIG. 7A is an elevated front perspective view of a magnetic object holder constructed in accordance with another embodiment of the present invention, wherein the tab is in an extended position.

FIG. 7B is another elevated front perspective view of the magnetic object holder of FIG. 7A, wherein the tab is in a relaxed position.

FIG. 7C is a top plan view of the magnetic object holder of FIG. 7A.

FIG. 7D is bottom plan view of the magnetic object holder of FIG. 7A.

FIG. 8A is an elevated side perspective view of a magnetic object holder constructed in accordance with another embodiment of the present invention.

FIG. 8B is a front elevational view of the magnetic object holder of FIG. 8A.

FIG. 8C is a rear elevational view of the magnetic object holder of FIG. 8A.

FIG. 8D is top plan view of the magnetic object holder of FIG. 8A.

FIG. 8E is bottom plan view of the magnetic object holder of FIG. 8A.

FIG. 13A is a top plan view of a weeded matrix of magnet covers or patches constructed in accordance with an embodiment of the present invention.

FIG. 13B is a top plan view of a magnet adhered to a heat transfer patch backed by a carrier layer.

DETAILED DESCRIPTION

Figure 1E:
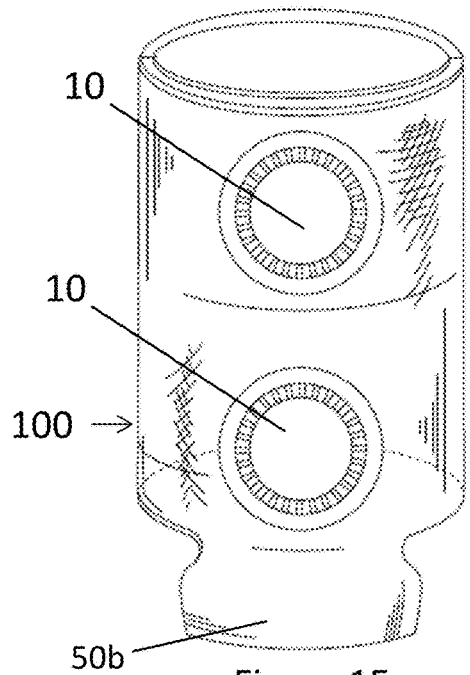
FIG. 1E is an elevated front perspective view of a magnetic object holder constructed in accordance with another embodiment of the present invention.
Figure 1F:
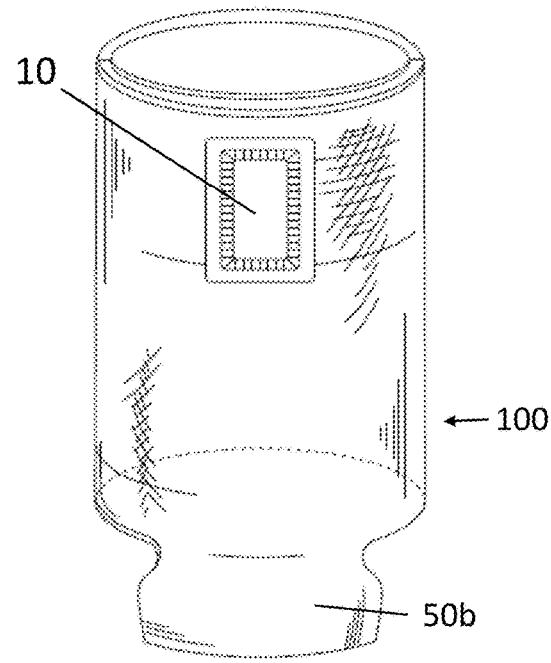
FIG. 1F is an elevated front perspective view of a magnetic object holder constructed in accordance with another embodiment of the present invention.
Figure 1G:
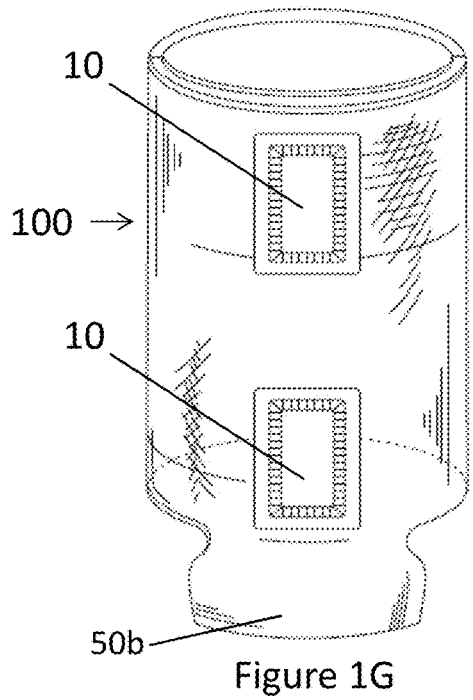
FIG. 1G is an elevated front perspective view of a magnetic object holder constructed in accordance with another embodiment of the present invention.
Figure 1H:
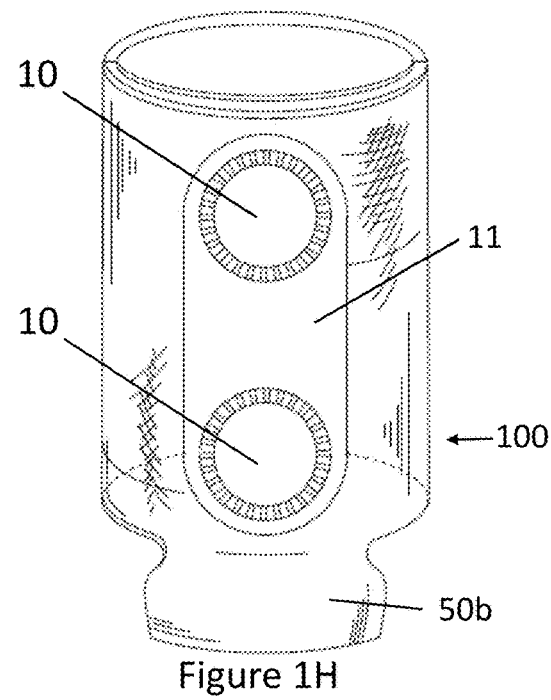
FIG. 1H is an elevated front perspective view of a magnetic object holder constructed in accordance with another embodiment of the present invention.
Figure 1I:
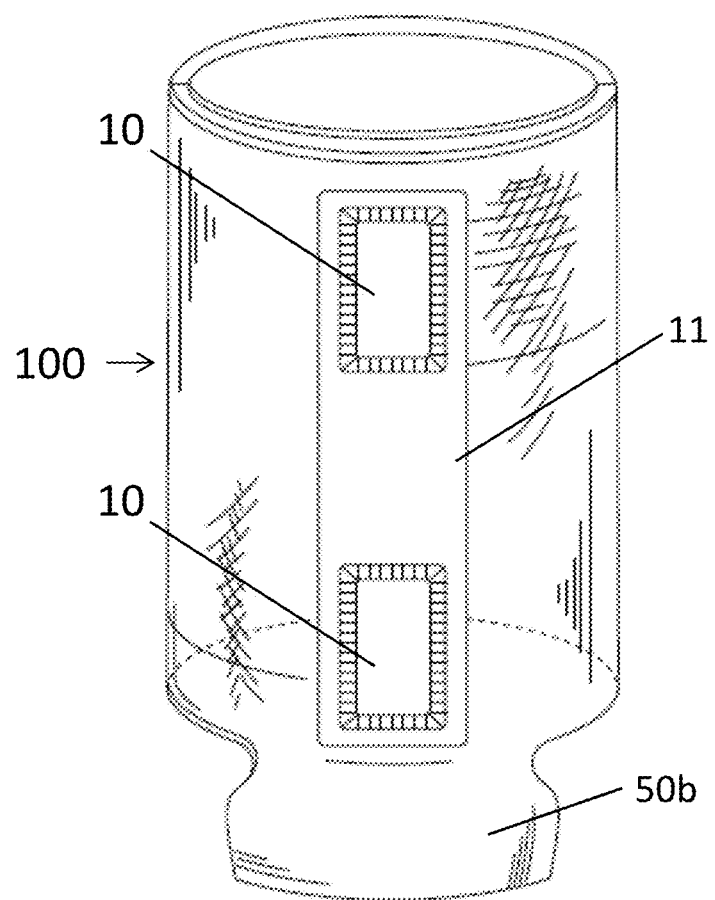
FIG. 1I is an elevated front perspective view of a magnetic object holder constructed in accordance with another embodiment of the present invention.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As described herein, an upright position is considered to be the position of apparatus components while in proper operation or in a natural resting position as described herein. The words "vertical", "horizontal", "above", "below", "side", "top", "bottom" and other orientation terms are described with respect to this upright position during operation unless otherwise specified. A person of skill in the art will recognize that the apparatus can assume different orientations when in use. It is also contemplated that embodiments of the invention may be in orientations other than upright without departing from the spirit and scope of the invention as set forth in the appended claims.

The term "when" is used to specify orientation for relative positions of components, not as a temporal limitation of the claims or apparatus described and claimed herein unless otherwise specified. The terms "above", "below", "over", and "under" mean "having an elevation or vertical height greater or lesser than" and are not intended to imply that one object or component is directly over or under another object or component.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The terms "comprising", "having", "including", and "containing" are to be construed as open-ended terms (i.e., meaning "including, but not limited to,") unless otherwise noted.

The terms "connected" and "coupled" are to be construed as partly or wholly contained within, attached to, or joined together, even if there is something intervening.

As used herein, the term "object" means any container, such as a cup, mug, can, bottle, flask, pot, box, tank, gas cylinder, aerosol can, and the like, and any other item, such as a flashlight, machinery, tool, appliance, and the like, which is desired or required to be secured to a ferromagnetic surface. It should be understood that virtually any item can constitute an "object," as the magnetic object holder disclosed herein can be adapted to various sizes and shapes within the constraints of the weight of the object relative to the strength of the magnet used.

As used herein, the term "ferromagnetic" means any material having a high susceptibility to magnetization and to which a magnet is attracted with a predictable magnetic force.

As used herein, the term "surface" means any surface to which an object may be desired or required to be attached, regardless of the orientation or texture of the surface. For example, a surface to which an object may be desired or required to be attached can be horizontal, vertical, sloped, even, uneven, porous, non-porous, smooth, or rough. As such, the object can be releasably attached to a surface in virtually any orientation, including horizontal, upright, inverted, or any intermediate position therebetween.

Referring to FIGS. 1A-12D, there are depicted various embodiments of a magnetic object holder configured to receive and releasably attach a wide variety of objects to virtually any ferromagnetic surface.

FIGS. 12A-12D illustrate an embodiment of a magnetic object holder 1200. The device 1200 includes a hollow, generally cylindrical body or tubular sleeve 80 having an annular cross section, an open upper end 14, an open lower end 16, an exterior surface 12, and an interior surface 18. The interior surface 18 defines an interior space 17 sized and shaped to receive and releasably retain or grip an object 7, such as a beverage container 7. To achieve this, the interior space 17 has an interior diameter 19 that is less than the exterior diameter 9 of the object 7. As such, when the object 7 is inserted into the interior space 17 through either the upper 14 or lower 16 open end, the body 80 stretches or expands around the object 7 and causes the interior surface 18 to frictionally engage the object 7 in an interference fit. In this way, the device 1200 tightly yet releasably grips and retains the object 7 in the interior space 17 of the body 80 without the need for releasable fasteners which can become inadvertently unfastened and release the object 7 prematurely. Additionally, the use of two open ends 14, 16 allows the sleeve 80 to grip and releasably retain objects that are longer than the sleeve 80 itself, which increases the versatility of the magnetic object holder 1200 beyond that of traditional holders which employ only one open end opposite a closed base portion.

In some embodiments, the body or sleeve 80 can include a tapered portion in order to increase the amount of interference, and thus the tightness of the fit, between the interior surface 18 of the body 80 and the exterior surface 8 of the object 7. A tapered body or sleeve can be particular advantageous for use with objects that have a tapered or non-cylindrical shape, including, for example, such common beverage containers as disposable coffee cups.

Figure 12A:
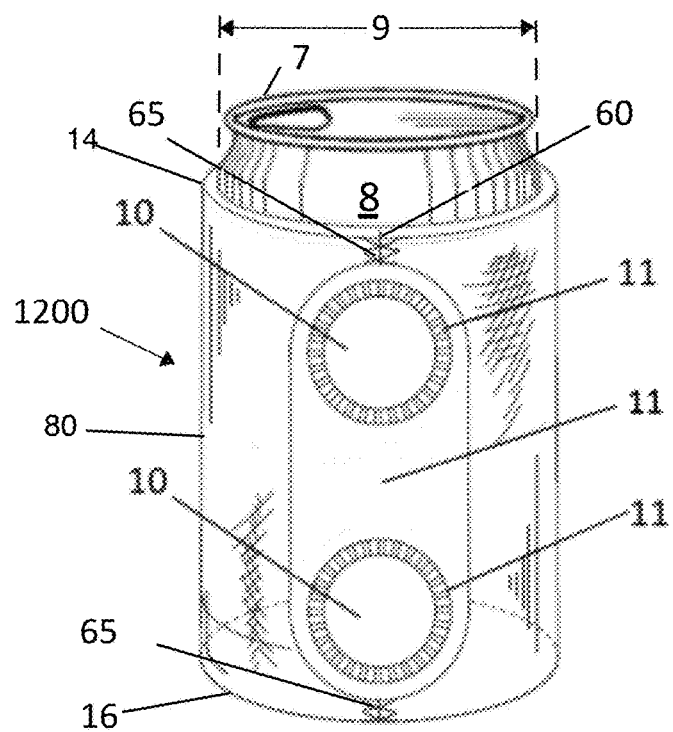
FIG. 12A is an elevated front perspective view of a magnetic object holder constructed in accordance with another embodiment of the present invention with a beverage container received therein.
Figure 12B:
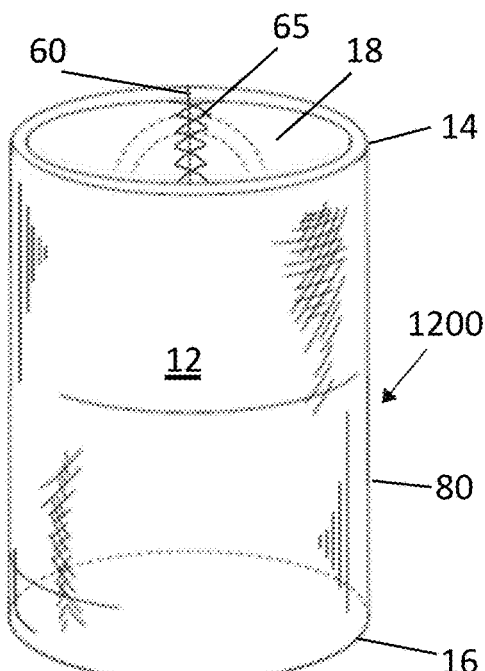
FIG. 12B is an elevated rear perspective view of the magnetic object holder of FIG. 12A with the beverage container removed.
Figure 12C:
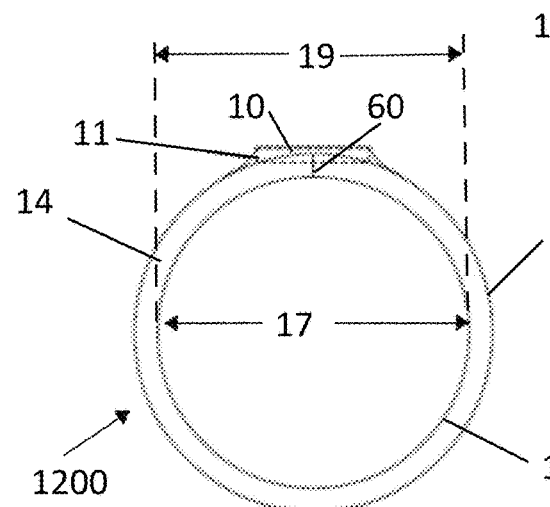
FIG. 12C is a top plan view of the magnetic object holder of FIG. 12A with the beverage container removed.
Figure 12D:
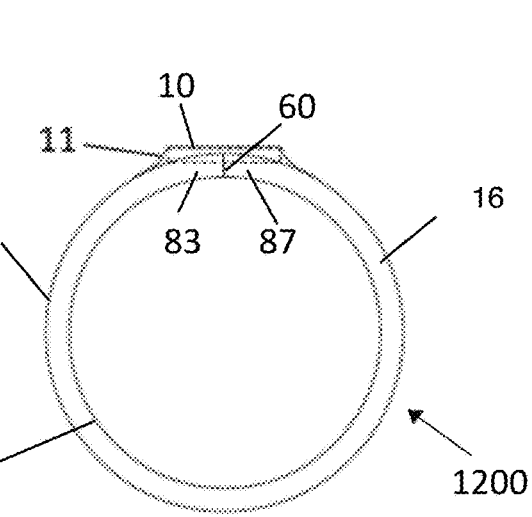
FIG. 12D is a bottom plan view of the magnetic object holder of FIG. 12A with the beverage container removed.

The body or sleeve 80 is formed from a flexible material, which in some embodiments, can advantageously be an insulating material such as rubber foam or neoprene. The body or sleeve 80 of the magnetic object holder 1200 is formed from a single generally rectangular sheet 85 of a flexible material, as exemplified in FIG. 11A. The sheet includes a first end 83 and a second end 87, each of which corresponds to the opposing short ends 83, 87 of the rectangular sheet 85. The body 80 of magnetic object holder 1200 is formed by placing first and second ends 83, 87 adjacent to each (i.e., end to end) and securing them together along a seam 60 as shown in FIGS. 12A-12B.

The first and second ends 83, 87 of the sheet 85 can be secured together using any means capable of reliably and lastingly securing the two ends 83, 87 together. In some embodiments, as shown in FIGS. 12A-12D, the ends 83, 87 are secured together along the seam 60 by a row of stitching 65. In other embodiments, ends 83, 87 can be fused, bonded, or adhered together along seam 60. For example, in some embodiments, the ends 83, 87 can be secured together using a durable, heat activated adhesive patch or bonding material such as heat transfer vinyl which is fused or bonded over the adjacent ends 83, 87 by the application of heat and pressure. When secured together along seam 60, ends 83, 87 of flexible sheet 85 do not overlap, thereby providing the magnetic object holder 1200 with continuous exterior and interior surfaces. This advantageously minimizes the chances that the ends 83, 87 will snag against a user's person, clothing, or environment and thereby becoming inadvertently separated and prematurely releasing the object 7 during use. This also maximizes the surface area of the interior surface 18 which frictionally grips the object.

The dimensions of the flexible sheet 85 can be varied to accommodate the diameter or other dimension of an object desired to be held in the device 1200, however, in one embodiment, the sheet 85 can have a width of approximately 4.0 inches, a length of approximately 8.0 inches, and a thickness of about 3.0 mm to about 6.0 mm.

Referring again to FIG. 12A, two magnets 10 are secured to the exterior surface 12 of the sleeve or body 80 by an overlying magnet cover or patch 11. However, in some embodiments exemplified by the flexible sheet 85 depicted in FIG. 11B, the magnets 10 can be secured to the sheet 85 before the ends 83, 87 of the sheet are secured together along seam 60 to form body 80. The magnets 10 enable the body 80, and thereby any object 7 received in the interior space 17, to be releasably attached or secured to a vertical or near vertical ferromagnetic surface, such as an automobile door or frame, a weight rack, a grill, a fence post, work bench, or other metal equipment or structure.

The magnet cover or patch 11 is formed from a thin yet durable adhesive material. In some embodiments, the patch 11 can be formed from a heat-activated adhesive patch or bonding material, such as heat transfer vinyl, which can be fused or bonded to the exterior surface 12 of the body 80 upon the application of heat and pressure. The patch 11 can have a larger surface area than either magnet 10 alone such that the periphery of the patch 10 overlaps or overhangs the perimeter of each magnet 10 as shown in FIG. 12A. As such, when heat pressed onto the body 80 as explained in more detailed below, the periphery of the patch 11 becomes integrally fused to the exterior surface 12 around a perimeter of the magnets 10, and thereby secures the magnets 10 to the sleeve or body 80 to form the magnet object holder 1200. Fusing the patch 11 to the sleeve 80 around the perimeter of the magnets 10 provides an improved aesthetic appearance and ensures that the edges of the patch 11 cannot become snagged or peeled away from the sleeve or body 80 to inadvertently release or separate the magnet 10 from the sleeve or body 80. In this way, the patch or patches 11 permanently secure the magnets 10 to the sleeve 80 and protect the magnets 10 from becoming dislodged during use of the magnetic beverage holder 1200.

It should be understood that although the magnetic object holder 1200 is depicted in FIGS. 12A-12D as including two magnets 10 covered by a single continuous patch 11, a magnetic object holder formed in accordance with additional embodiments of the present invention can alternatively have a greater or lesser number of magnets 10 secured thereto by the same or a lesser number of adhesive magnet patches 11. For example, each magnet 10 can be covered and secured to the body or sleeve 80 of a magnetic object holder by a separate patch 11, as exemplified in FIG. 11B.

Referring again to FIGS. 12A-12D, in some embodiments, the magnets 10 and overlying patch 11 can be positioned over the seam 60 and stitching 65. Such a configuration helps maintain seam 60 securely closed by protecting the stitching 65 from becoming severed and thus the ends 83, 87 of the sheet 85 from becoming inadvertently separated. Consequently, it can be advantageous for the patch 11 to cover a greater portion of the stitching 65 or other closure means than the magnets 10. In some embodiments, the patch 11 can cover substantially all of the stitching 65 or other closure means not already covered by one or more magnets 10. By covers "substantially all" of the stitching or other closure means it is meant that the patch 11 overlies or covers all the stitching 65 or other closure means which is visible from the exterior surface 12 of the device 1200 and which is not covered by a magnet 10. However, in other embodiments, one or more magnets 10 can alternatively be secured by a magnet cover or patch 11 to a portion of the body 80 of the magnetic object holder 1000 at a location spaced away from the seam 60 and stitching 65, as exemplified in FIG. 10.

It should be noted that although the magnets 10 in FIGS. 12A-12D are secured to an exterior surface 12 of the sheet of flexible material 85 forming the body or sleeve 80 of the magnetic object holder 1200, in some embodiments, one or more magnets 10 can alternatively be secured within a portion of the constituent material from which the body or sleeve 80 of the magnetic object holder is formed.

Figure 9:
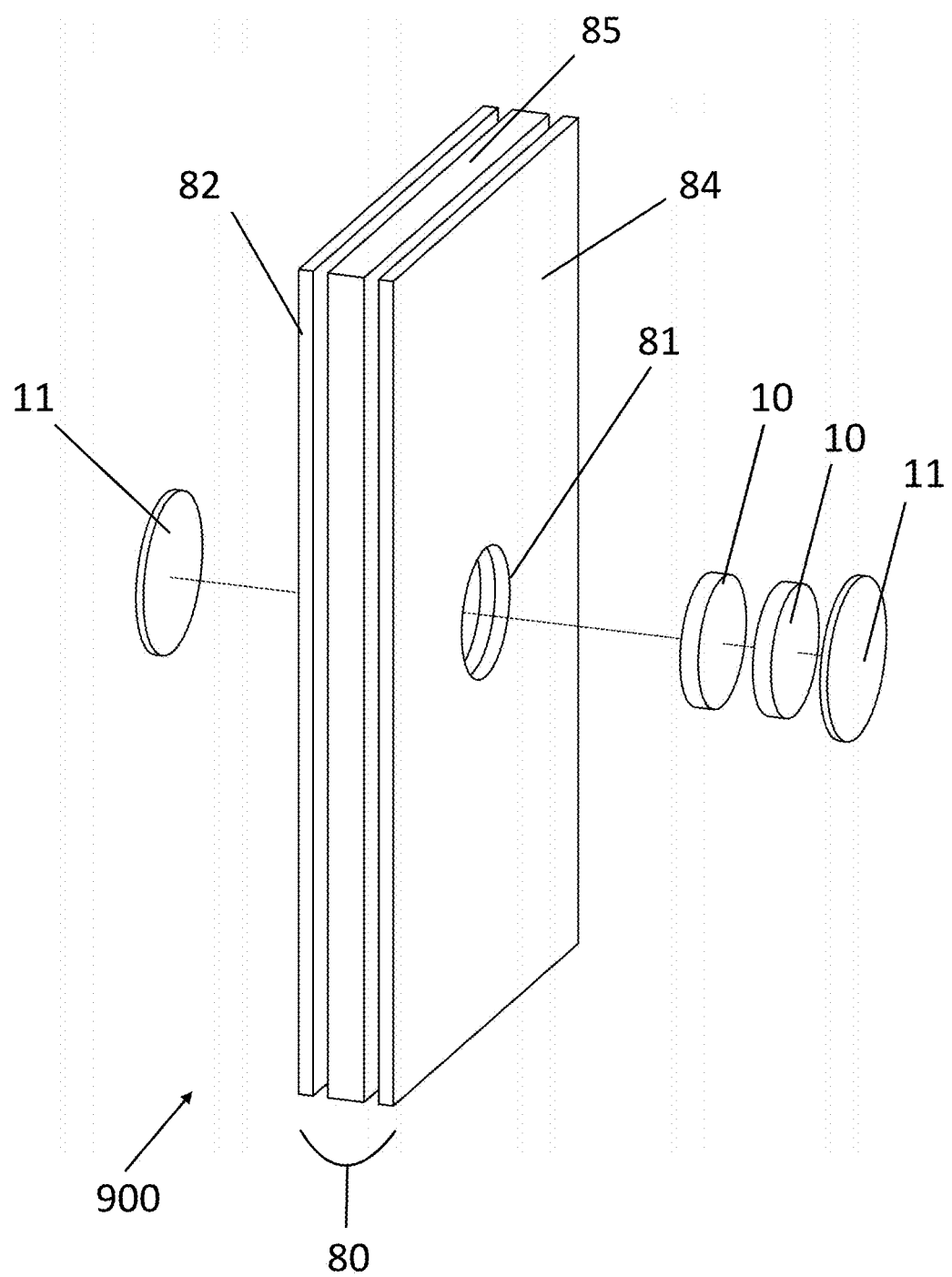
FIG. 9 is an exploded view of a portion of a magnetic object holder constructed in accordance with an embodiment of the present invention.
Figure 10:
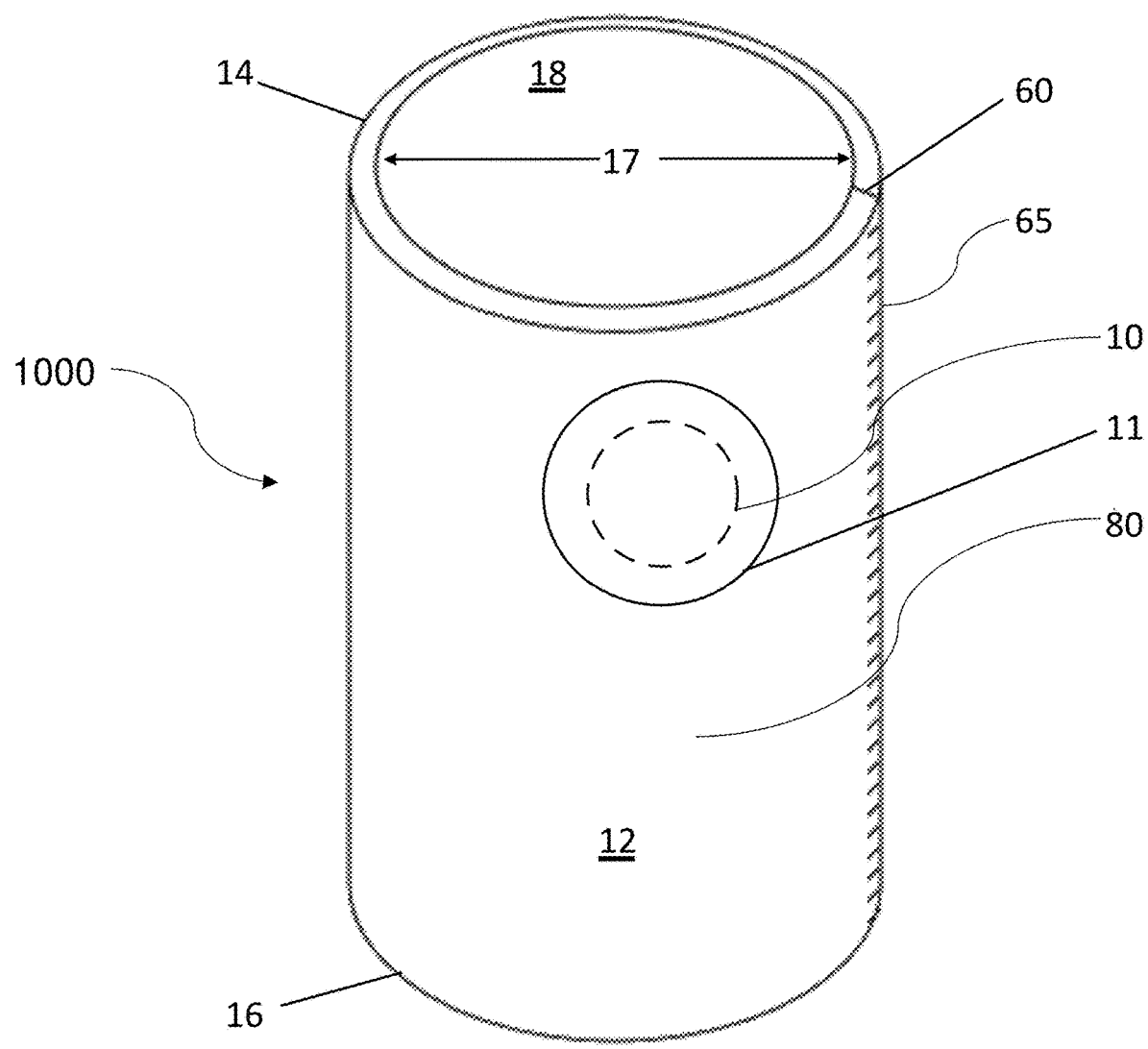
FIG. 10 is an elevated perspective view of a magnetic object holder constructed in accordance with another embodiment of the present invention.

Referring now to FIG. 9, there is a shown a portion of another embodiment of a magnetic object holder 900 constructed in accordance with the present invention. The body 80 of the device 900 includes an inner or middle insulation layer 85 and two wicking layers 82, 84 bonded to either side of the insulation layer 85. The insulation layer 85 can be formed from any flexible insulating material, including rubber foam and neoprene, while the wicking layers 82, 84 can be formed from any flexible natural or synthetic textile. In some embodiments, the wicking layers 82, 84 can be formed from a textile upon which a design may be printed, such as a polyester fabric. In other embodiments, the exterior layer 84 can be formed from a resilient, or even rigid, polymer, including an extruded polymer.

An aperture 81 sized to receive one or more magnets 10 is provided through the exterior layer 84 and at least partially through a portion of the insulation layer 85. In some embodiments, however, the aperture 81 can extend completely through the insulation layer 85 and both the inner and exterior layers 82, 84. The aperture 81 can be sized to have approximately the same diameter as the one or more magnets 10 in order to ensure a snug fit when the one or more magnets 10 are received in the aperture 81. A magnet cover or patch 11 fused or bonded to the surface of each respective wicking layer 82, 84 covers and secures the one or more magnets 10 within the body 80 of the magnetic object holder 900.

In other embodiments, the aperture 81 can extend through the insulating layer 85 only, and the one or more magnets 10 can be placed in the aperture 81 before the wicking layers 82, 84 are bonded to their respective sides of the insulating layer 85. This eliminates the need for one or more separate magnet covers or patches 11 by relying on the wicking layers 82, 84 to retain the one or more magnets 10 in the aperture 81. Such a construction also advantageously permits a user to reverse (i.e., turn inside out) the magnetic beverage holder 900 so as to hide or display an uninterrupted design printed on one or both wicking layers 82, 84. In such embodiments it is advisable to position the aperture 81 at a location spaced away from any seam 60, as exemplified in FIG. 10, so as to avoid unnecessarily weakening the structural integrity of the body 80.

FIGS. 2A-2D depict another embodiment of a magnetic object holder 200 formed in accordance with the present invention. Magnetic object holder 200 is alike in all aspects of form and function to magnetic object holder 1200 except as subsequently specifically described. Specifically, body or sleeve 280 is formed with three layers, including an insulative middle layer 85, a moisture wicking exterior layer 84 having an exterior surface 12, and a moisture wicking interior layer 82 having an interior surface 18. The interior surface 18 of interior layer 82 defines an interior space 17 having an interior diameter 19 that is less than an exterior diameter 9 of an object 7 to be received in the interior space 17, such as a beverage container 7. In use, the interior surface 18 of the interior layer 82 frictionally engages and wicks moisture away from an exterior surface 8 of the object 7, while the exterior surface 12 of exterior layer 84 wicks moisture away from a user's hand.

However, in some embodiments, either one or both of interior layer 82 and exterior layer 84 can be omitted such that the body or sleeve 80 is formed from a single layer 85 of flexible material. In additional embodiments, all or a portion of the body 80 can be formed from a resilient or even rigid polymeric material, such as an extruded plastic, in order to provide a snap fit fitment between the object 7 and the interior surface 18 of the body 80. For purposes of clarity, a seam 60 is therefore omitted from FIGS. 2A-2D, although it is to be understood that the magnetic object holder 200 can include a vertical seam located anywhere around the circumference of the body 80.

In embodiments of a magnetic object holder 200 which include only a single magnet 10, such as that depicted in FIGS. 2A-2D, it can be desirable to secure the magnet 10 to a portion of the body or sleeve 80 located near the open top end 14 where the magnet 10 will be above the center of gravity of the object 7 desired to be received in the interior space 17. This helps improve the stability of the magnetic object holder 200 while it is in use and releasably attached to a ferromagnetic surface.

Figure 2A:
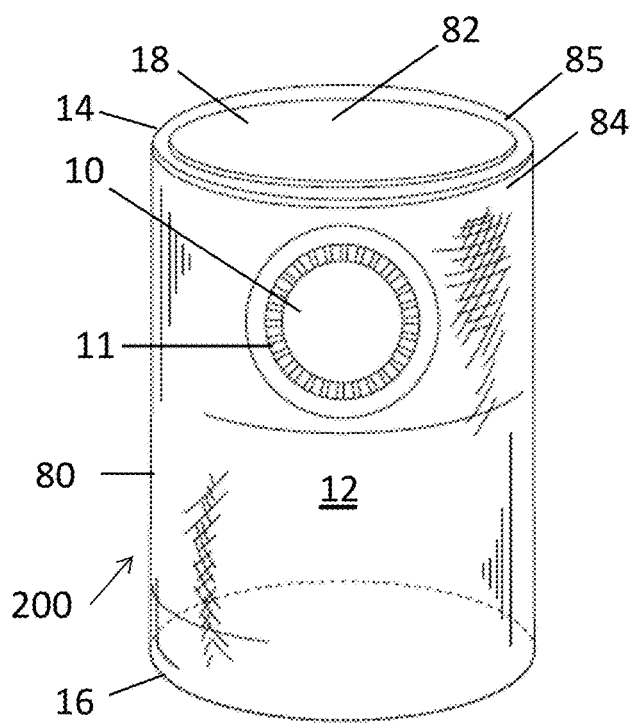
FIG. 2A is an elevated front perspective view of a magnetic object holder constructed in accordance with another embodiment of the present invention.
Figure 2B:
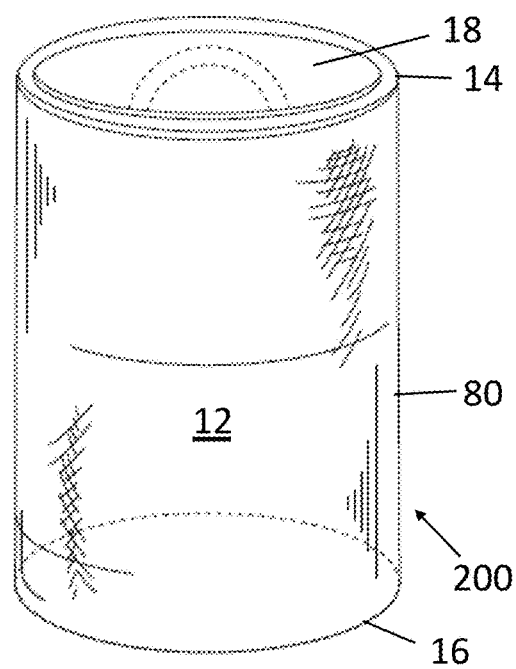
FIG. 2B is an elevated rear perspective view of the magnetic object holder of FIG. 2A.
Figure 2C:
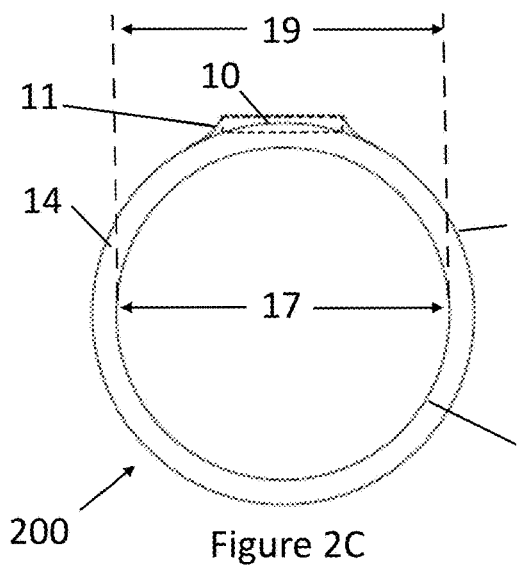
FIG. 2C is a top plan view of the magnetic object holder of FIG. 2A.
Figure 2D:
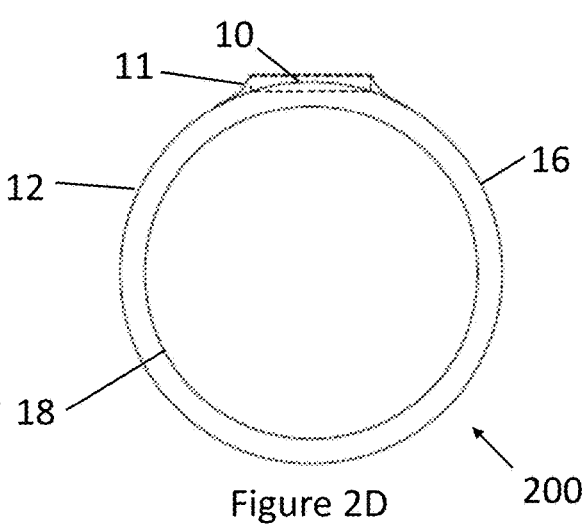
FIG. 2D is bottom plan view of the magnetic object holder of FIG. 2A.
Figure 2E:
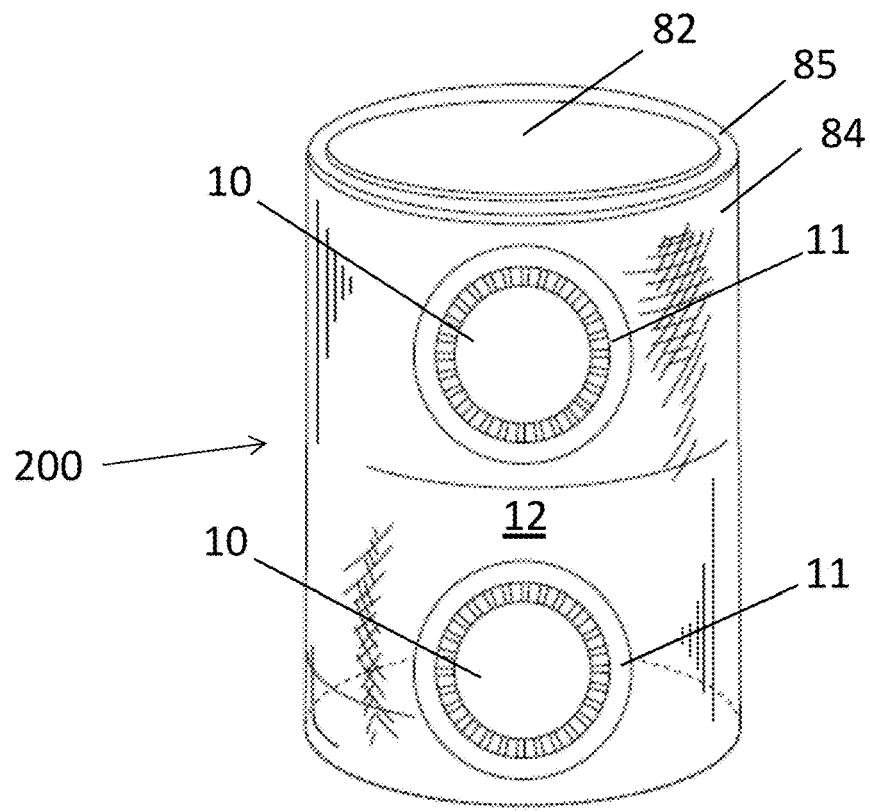
FIG. 2E is an elevated front perspective view of a magnetic object holder constructed in accordance with another embodiment of the present invention.
Figure 2F:
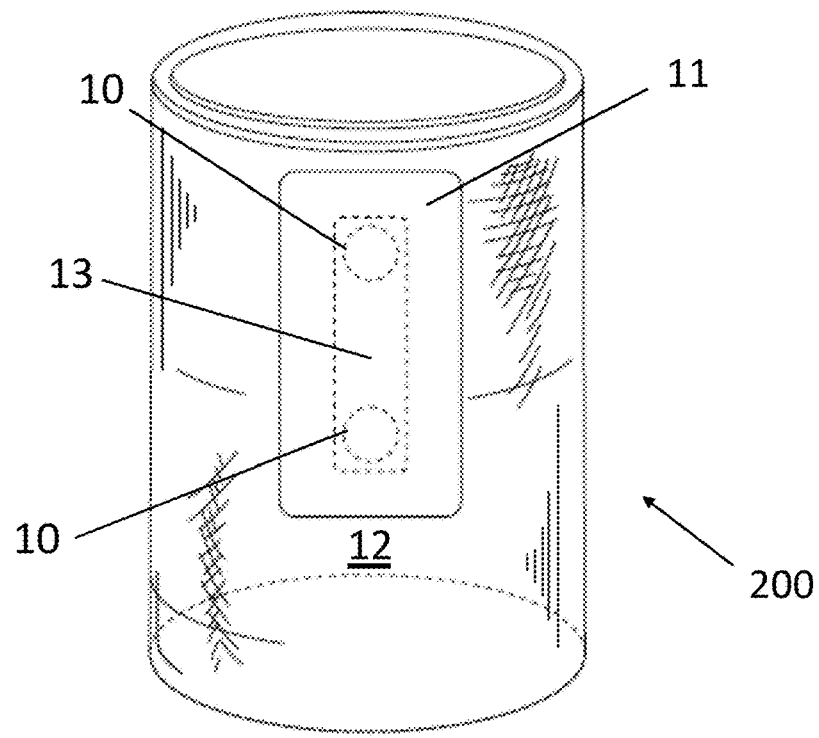
FIG. 2F is an elevated front perspective view of a magnetic object holder constructed in accordance with another embodiment of the present invention.
Figure 3A:
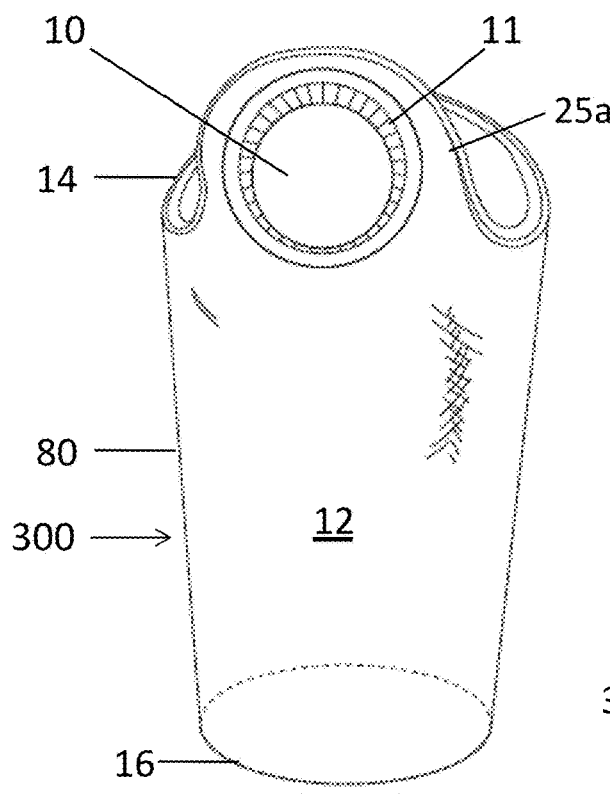
FIG. 3A is an elevated front perspective view of a magnetic object holder constructed in accordance with another embodiment of the present invention.
Figure 3B:
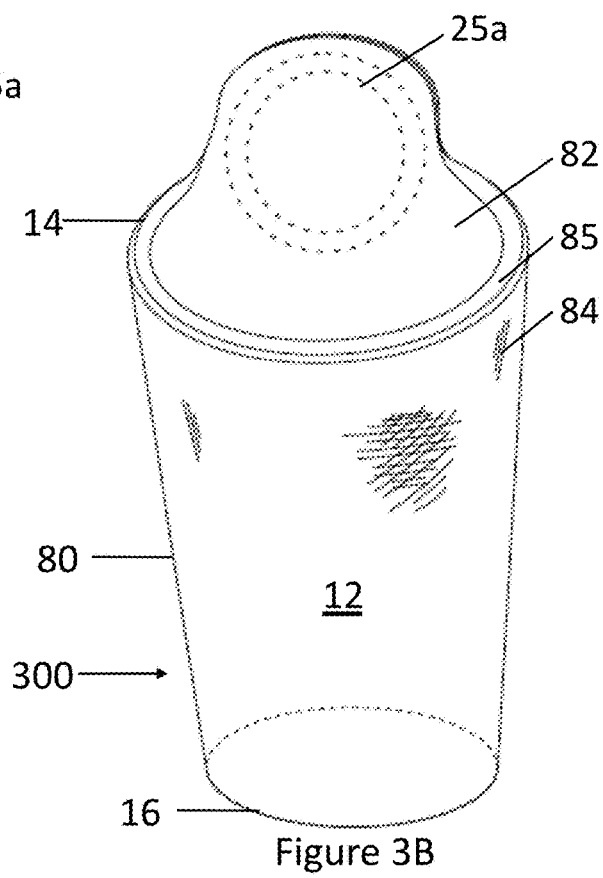
FIG. 3B is an elevated rear perspective view of the magnetic object holder of FIG. 3A.
Figure 3C:
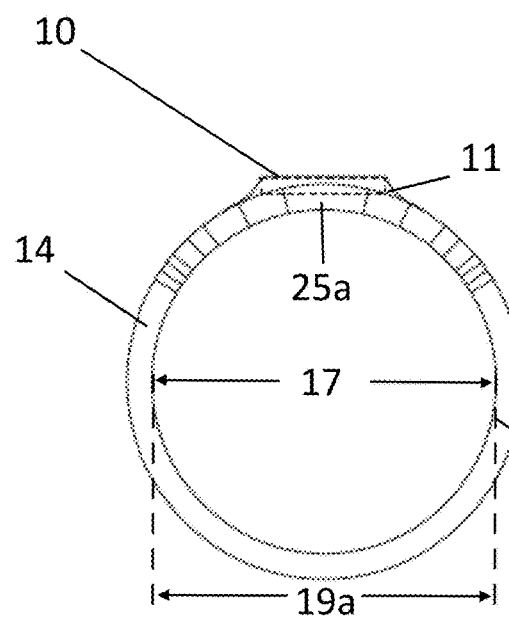
FIG. 3C is a top plan view of the magnetic object holder of FIG. 3A.
Figure 3D:
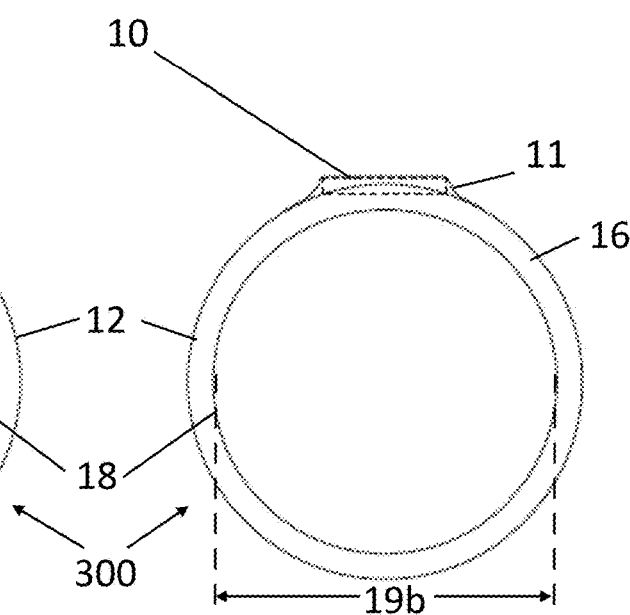
FIG. 3D is bottom plan view of the magnetic object holder of FIG. 3A.

In additional embodiments, the magnetic object holder 200 can be provided with two magnets 10 vertically aligned on the same side of the sleeve or body 80 as shown in FIG. 2E, or, alternatively, one elongated bar magnet 13 as shown in FIG. 2F. In embodiments wherein two magnets are provided, the magnets 10 can be secured to the body or sleeve 80 by an equal number of adhesive patches 11 (as shown in FIG. 2E) or a single patch 11 (as shown in FIG. 2F).

FIGS. 3A-3D depict another embodiment of a magnetic object holder 300 formed in accordance with the present invention. Magnetic object holder 300 is alike in all aspects of form and function to magnetic object holder 200 except as subsequently specifically described. Specifically, the sidewalls of body 80 of magnetic object holder 300 are tapered so that the upper open end 14 has an interior diameter 19a that is greater than the interior diameter 19b of the lower open end 16. The upper end 14 of body 80 also includes an integrally formed, flexible lobe or tab 25a that extends upwardly above the lip of open upper end 14. A single magnet 10 is secured by a magnet cover or patch 11 to the tab 25a as previously described. The tab 25a is configured to extend above the center of gravity of an object 7, such as a beverage container, when the object 7 is received in the body or sleeve 80 in order to increase the stability of the device 300 while it is releasably attached to a vertical or near vertical ferromagnetic surface.

Figures 5A, 5B:
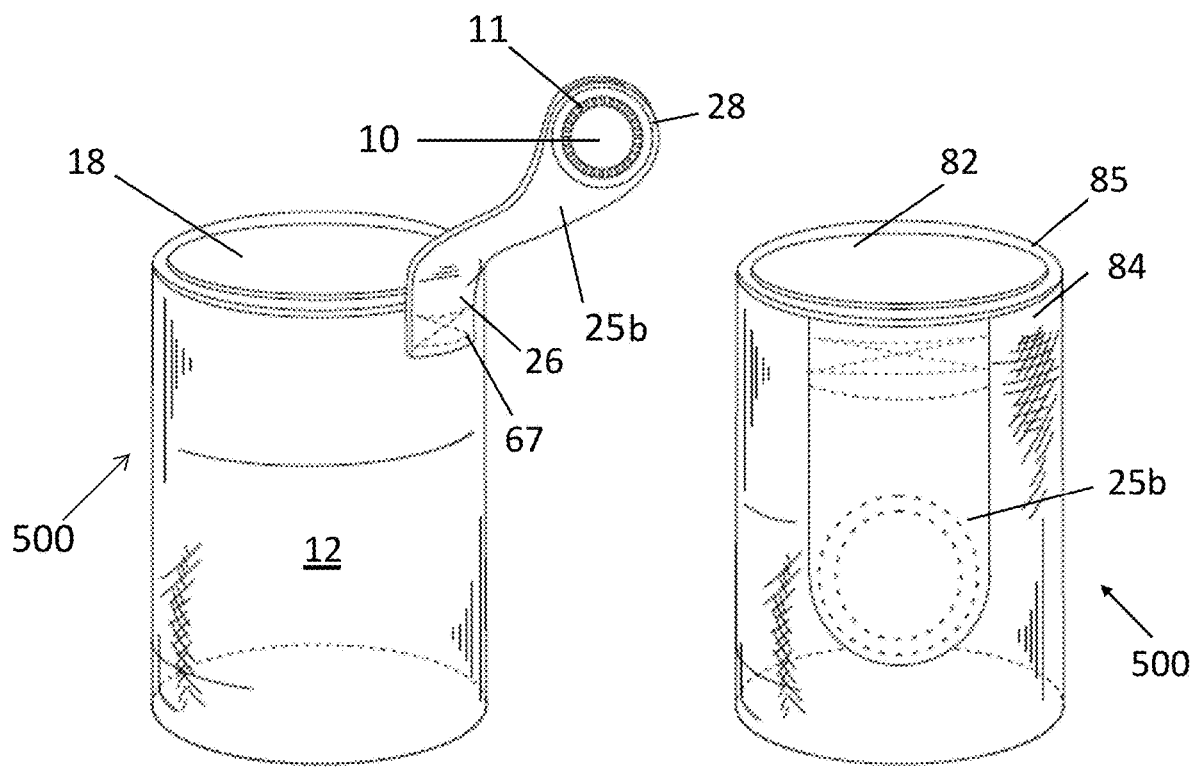
FIG. 5A is an elevated side perspective view of a magnetic object holder constructed in accordance with another embodiment of the present invention.
FIG. 5B is an elevated rear perspective view of the magnetic object holder of FIG. 5A.
Figures 5C, 5D:
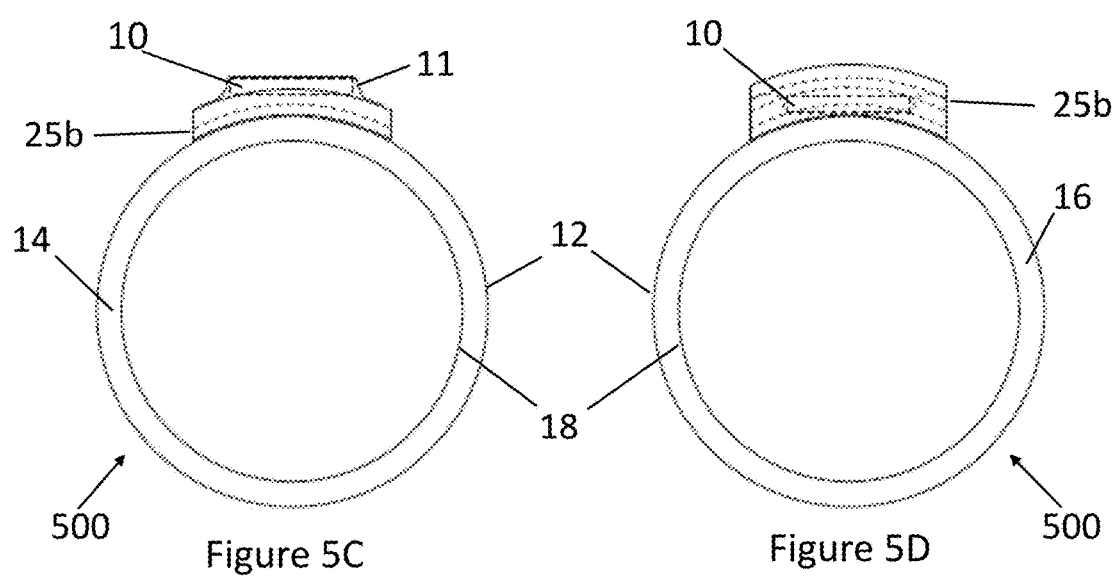
FIG. 5C is a top plan view of the magnetic object holder of FIG. 5A.
FIG. 5D is bottom plan view of the magnetic object holder of FIG. 5A.
Figures 6A, 6B:
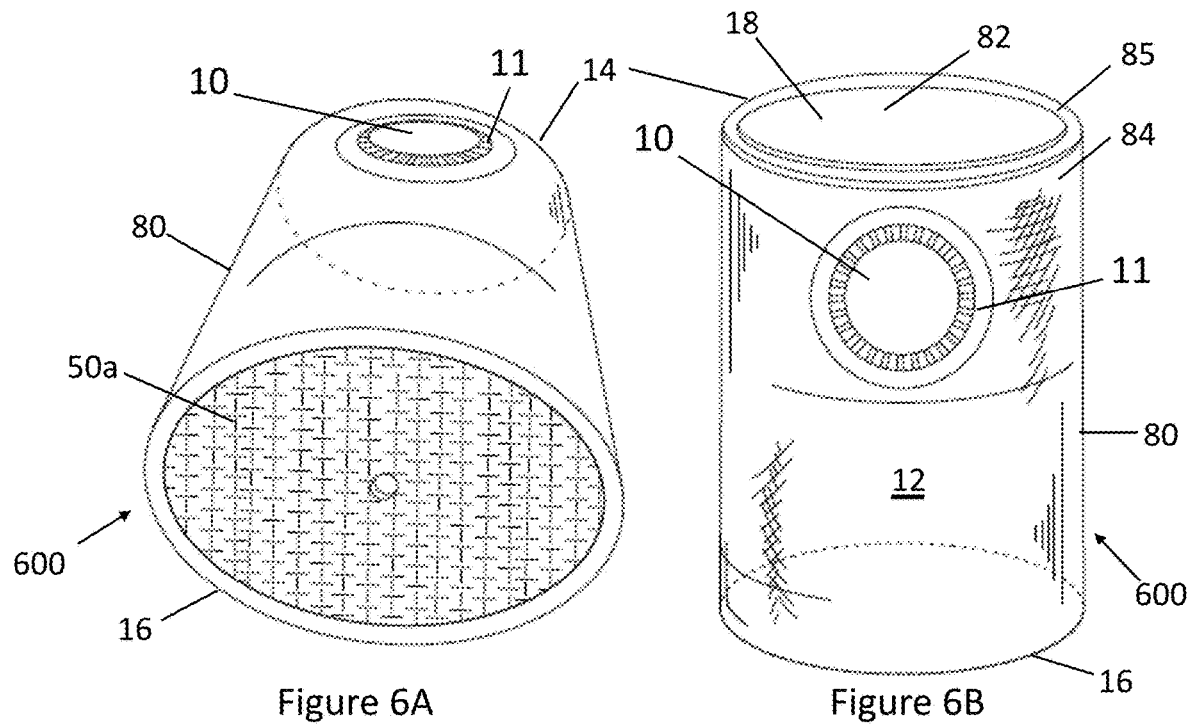
FIG. 6A is a bottom perspective view of a magnetic object holder constructed in accordance with another embodiment of the present invention.
FIG. 6B is an elevated front perspective view of the magnetic object holder of FIG. 6A.
Figures 6C, 6D:
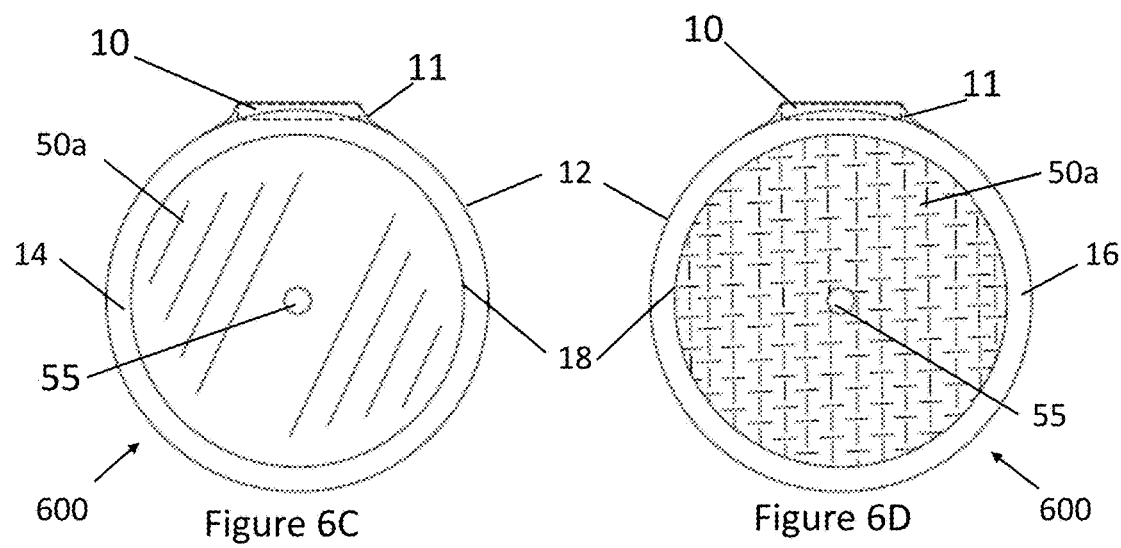
FIG. 6C is a top plan view of the magnetic object holder of FIG. 6A.
FIG. 6D is bottom plan view of the magnetic object holder of FIG. 6A.

FIGS. 5A-5D depict another embodiment of a magnetic object holder 500 formed in accordance with the present invention. Magnetic object holder 500 is alike in all aspects of form and function to magnetic object holder 300 except as subsequently specifically described. Specifically, magnetic object holder 500 has a hollow, generally cylindrical body or tubular sleeve 80, and omits flexible tab 25a in favor of elongated flexible tab 25b. The flexible tab 25b includes a proximal end 26 and a free distal end 28. The proximal end 26 is secured to the upper open end 14 of the body or sleeve 80 by stitching 67. However, in other embodiments, the proximal end 26 of tab 25b can be adhered or fused to the upper end 14 of the body or sleeve 80. Tab 25b is elongated so to allow the tab 25b to relax and fold downward when not in use, as best shown in FIG. 5B. The elongated flexible tab 25b allows the device 500 to be releasably attached to and stably hang from any ferromagnetic surface, regardless of the orientation of the surface.

Figure 7E:
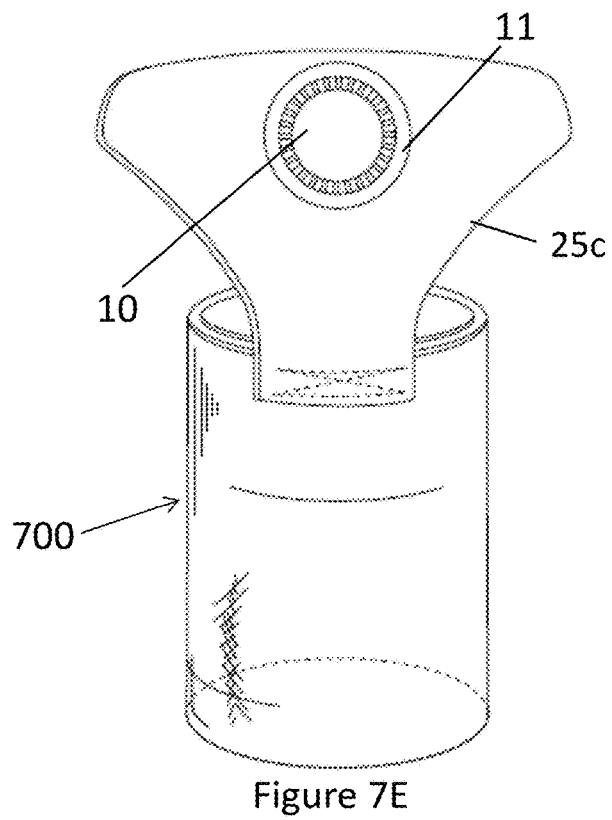
FIG. 7E is an elevated front perspective view of a magnetic object holder constructed in accordance with another embodiment of the present invention, wherein the tab is in an extended position.
Figure 7F:
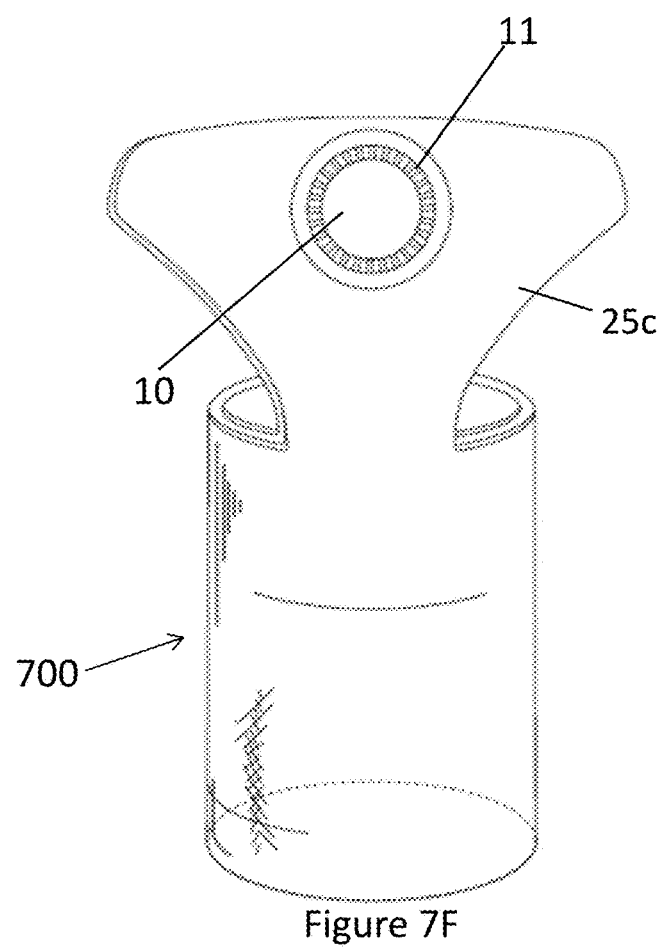
FIG. 7F is an elevated front perspective view of a magnetic object holder constructed in accordance with another embodiment of the present invention, wherein the tab is in an extended position.

FIGS. 7A-7D depict another embodiment of a magnetic object holder 700 formed in accordance with the present invention. Magnetic object holder 700 is alike in all aspects of form and function to magnetic object holder 500 except as subsequently specifically described. Specifically, magnetic object holder 700 omits flexible tab 25b in favor of wider flexible tab 25c. A pair of magnets 10 is secured by a pair of magnet covers or patches 11 to the distal end 28 of the tab 25c as previously described. However, in other embodiments, a single magnet 10 can be secured to the distal end 28 of the tab 25c, as shown in FIG. 7E. In additional embodiments, the flexible tab 25c can be integrally formed with the body or sleeve of the magnetic object holder 700, as shown in FIG. 7F.

FIGS. 4A-4D depict another embodiment of a magnetic object holder 400 formed in accordance with the present invention. Magnetic object holder 400 is alike in all aspects of form and function to magnetic object holder 500 except as subsequently specifically described. Specifically, magnetic object holder 400 omits flexible tab 25b in favor of flexible grab handle 30, which provides a convenient loop or handle for a user to grasp when holding or manipulating an object 7 received in the interior space 17 of the magnetic object holder 400. The handle 30 includes an upper end 34 and a lower end 36, each of which are secured to the respective upper 14 and lower 16 ends of the exterior surface 12 of the body or sleeve 80 by stitching 37. However, in other embodiments, the upper and lower ends 34, 36 of handle 30 can be adhered or fused to the upper 14 and lower 16 ends of the body 80. A single magnet 10 is secured by a magnet cover or patch 11 to the upper end 34 of the handle 30 as previously described, although more magnets 10 can be used.

FIGS. 8A-8E depict another embodiment of a magnetic object holder 800 formed in accordance with the present invention. Magnetic object holder 800 is alike in all aspects of form and function to magnetic object holder 1200 except as subsequently specifically described. Specifically, magnetic object holder 800 includes an elongated decorative sidewall 45 on one side of the body or sleeve 80. In one embodiment, the decorative sidewall 45 can be formed as part of an exterior flexible layer 84 of the body 80. In another embodiment, the decorative sidewall or cover 45 can be formed from a resilient or rigid polymeric material. The decorative sidewall 45 is provided on an opposite side of the body 80 from the pair of magnets 10 to cover and protect an object 7 received in the interior space 17, such as an open beverage container 7, from possible contaminants that could undesirably fall or become blown into the container 7. Although the decorative cover 45 is depicted as having the appearance of a football, other aesthetic appearances can be used.

FIGS. 6A-6D depict another embodiment of a magnetic object holder 600 formed in accordance with the present invention. Magnetic object holder 600 is alike in all aspects of form and function to magnetic object holder 200 except as subsequently specifically described. Specifically, magnetic object holder 600 further includes a bottom or base portion 50a which closes the lower end 16 of body 80 and is configured to provide further support for an object 7 received in the interior space 17 and prevent the object 7 from prematurely exiting the body 18 through the lower end 16. An aperture 55 defined through the base portion 50a allows liquid to drain or pass through the bottom 16 of the device 600. The base portion 50a can be integrally formed with the body 80 of the device 600 as part of one or more previously described layers 82, 84, 85, or separately formed from a piece of flexible material and subsequently secured to the lower end 16 of the body 80.

Figure 11A:
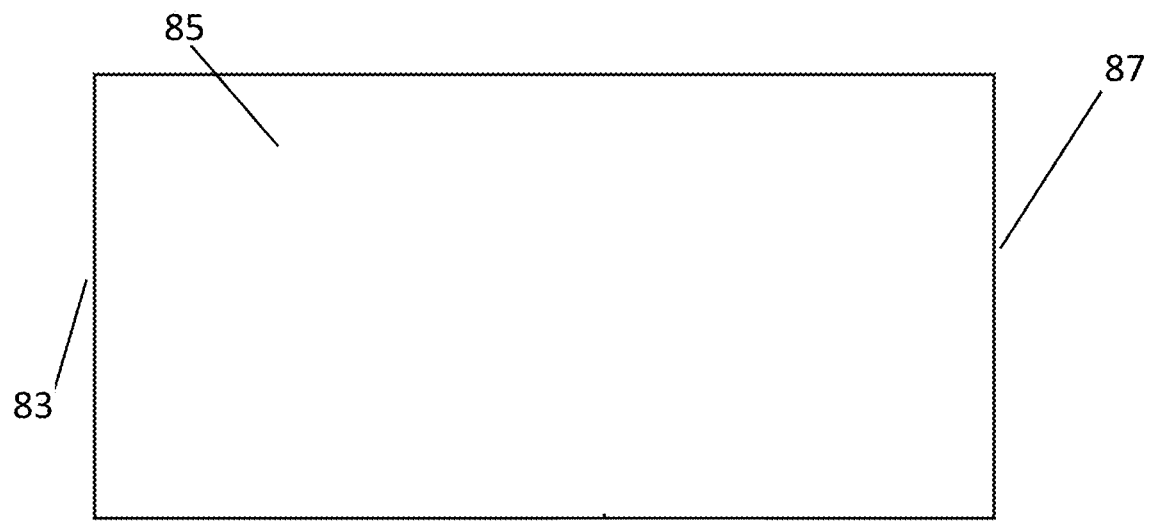
FIG. 11A is a top plan view of an embodiment of a flexible sheet for use in construction of a magnetic object holder of the present invention.
Figure 11B:
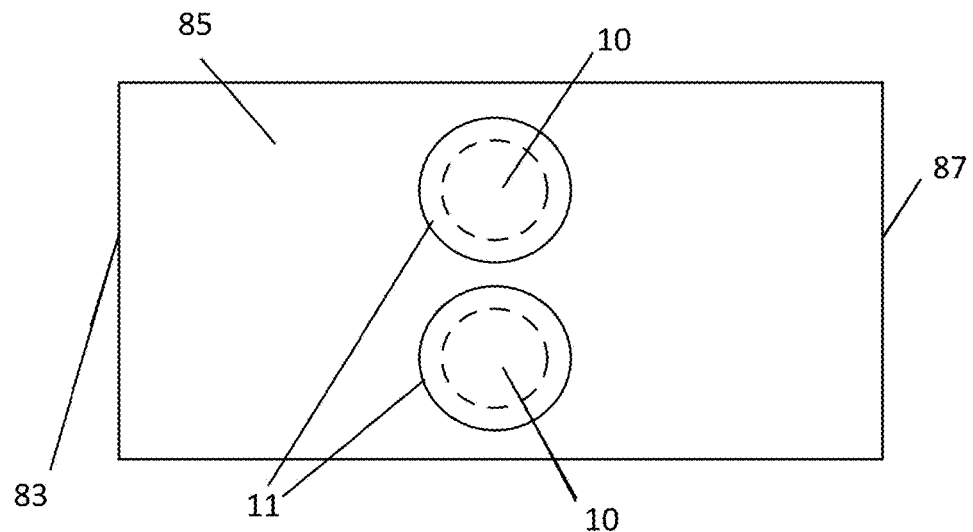
FIG. 11B is a top plan view of another embodiment of a flexible sheet for use in construction of a magnetic object holder of the present invention.
Figure 11C:
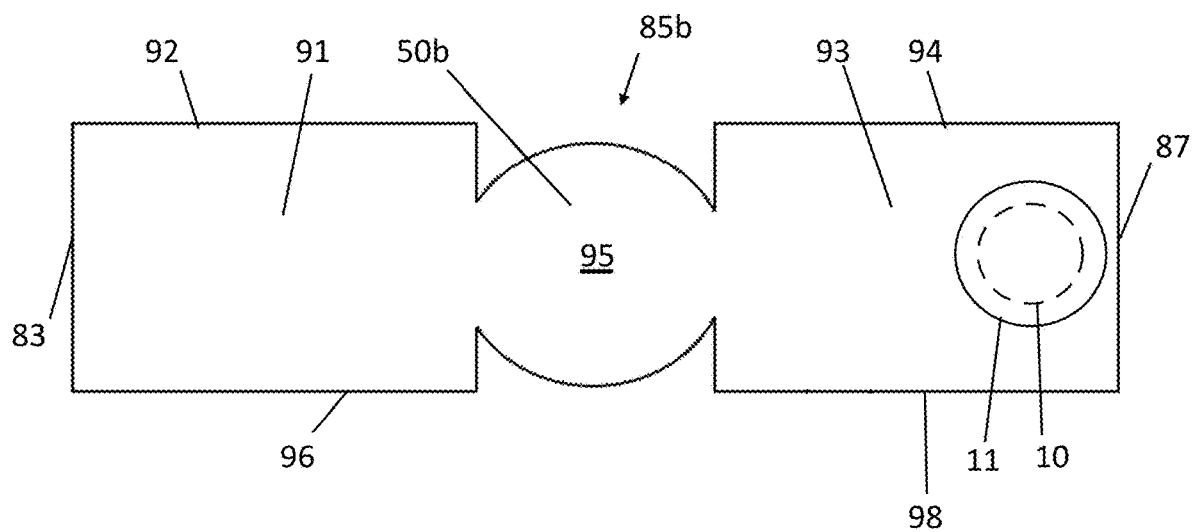
FIG. 11C is a top plan view of yet another embodiment of a flexible sheet for use in construction of a magnetic object holder of the present invention.

FIGS. 1A-1D depict another embodiment of a magnetic object holder 100 formed in accordance with the present invention. Magnetic object holder 100 is alike in all aspects of form and function to magnetic object holder 600 except as subsequently specifically described. Specifically, magnetic object holder 100 omits base portion 50a in favor of base portion 50b. Base portion 50b is integrally formed with body 80 from a single sheet 85b of flexible material having two generally rectangular portions 91, 93 connected by an elliptical portion 95 extending between the two substantially rectangular portions 91, 93, as illustrated in FIG. 11C. The body 80 of magnetic object holder 100 with integral base portion 50b is formed from flexible sheet 85b by securing edge 92 of the first rectangular portion 91 to edge 94 of the second rectangular portion 93 to form seam 61, and securing edge 96 of the first rectangular portion 91 to edge 98 of the second rectangular portion 93 to form seam 62, as shown in FIGS. 1A-1D. Suitable methods for securing the edges of flexible sheet 85b together along seams 61, 62 previously described above with respect to assembly of magnetic object holder 1200. Once corresponding edges 92, 94 and edges 96, 98 are secured along seams 61, 62, respectively, the opposing ends 83, 87 of flexible sheet 85b form the upper open end 14 or lip of the body 80 of magnetic object holder 100. When secured together along seams 61, 62, corresponding edges 92, 94 and edges 96, 98 of flexible sheet 85b advantageously do not overlap. In this way, the magnetic object holder 100 is advantageously provided with continuous exterior and interior surfaces.

As exemplified in FIG. 11C, one or more magnets 10 can be secured to an exterior surface or within a portion of the flexible sheet 85b by one or more magnet covers or patches 11 as previously described before the corresponding edges 92, 94 and edges 96, 98 of flexible sheet 85b are secured together along seams 61, 62, respectively, to form the body 80 of magnetic object holder 100.

Referring now to FIGS. 1E-1I, in other embodiments, the magnetic object holder 100 can be formed with one or more magnets 10 of different shapes secured to the body 80 of the device 100 by one or more magnet covers or patches 11 as previously described. In some embodiments, the one or more magnets 10 and patches 11 can be secured to the body 80 after the corresponding edges 92, 94 and edges 96, 98 of flexible sheet 85b are secured together along seams 61, 62, respectively. In other embodiments, the one or more magnets 10 and patches 11 can be secured to one or the rectangular portions 91, 93 of the flexible sheet 85b before corresponding edges 92, 94 and edges 96, 98 are secured together. In additional embodiments, two or more magnets 10 are vertically aligned and secured to the same side of the device 100.

Magnets suitable for use in all embodiments of the invention disclosed herein include relatively small magnets having a stronger magnetic force than that of common household magnets known widely as "refrigerator magnets." Preferred magnets include those capable of securing an object weighing from about 0.35 to about 1.0 kilograms or more to a ferromagnetic surface. In additional embodiments, suitable magnets include rare earth magnets having a strength of about 10,000 Gauss or more. In some embodiments, suitable magnets include neodymium magnets having a grade of N30, N35, N38, N42, or N52. In some embodiments, magnets suitable for use in the present invention include magnets with a layer of double sided adhesive on both sides.

Although the shape and size of the magnets can be varied to suit an intended application, in some embodiments, the magnets can be circular or generally rectangular in shape. Circular magnets can have, in some embodiments, a diameter of about 1.0 inch and a thickness of about 0.125 inches. Generally rectangular magnets can have, in some embodiments, a length of from about 1.0 to about 3.0 inches, a width of about 0.5 to about 1.0 inches, and a thickness of about 0.125 inches.

Generally, an embodiment of a magnetic object holder of the present invention can be formed according to the following steps.

A generally rectangular piece or sheet of neoprene having a width of about 4.0 inches, a length of about 8.0 inches, and a thickness of from about 3.0 mm to about 6.0 mm is obtained. The two opposing short ends 83, 87 of the neoprene sheet 85 are sewn together along a seam 60 with stitching 65 to form a flexible insulated tubular sleeve 80 having two opposing open ends 14, 16 as discussed above and illustrated in FIGS. 10, 11A, and 12A-12B.

Two neodymium N52 disc-shaped magnets having a diameter of about 1.0 inch and a thickness of about 0.125 inches are obtained. The magnets have a layer of double-sided adhesive adhered to each side. A thin removable backing layer covers the surface of each adhesive layer opposite the magnet (i.e., the exterior surface of the adhesive layer facing away from the magnet). The backing layer can include a pull tab to facilitate quick and easy manual removal of the backing layer to expose the underlying adhesive adhered to each surface of the magnets.

A roll of heat transfer vinyl material is obtained. The heat transfer vinyl material is backed by a transparent, pressure-sensitive tacky carrier layer 99 (FIG. 13A). The heat transfer vinyl is placed into a computer-controlled cutting plotter and a matrix or plurality of circular patches 11 is generated. Each patch 11 has a diameter of about 1.5 inches. Excess heat transfer vinyl material is then "weeded" or removed from around each patch 11 while the patches 11 are still adhered to the carrier layer 99, to create a sheet comprising a matrix of patches 11 as exemplified in FIG. 13A. The carrier layer 99 is then cut up or divided into multiple individual pieces wherein each piece of carrier layer 99 carries a single patch 11 and a portion of carrier layer 99 extends beyond the perimeter of each patch 11, as exemplified in FIG. 13B. This periphery of carrier layer 99 is used to hold the patch 11 in place on the surface of the neoprene sleeve 80 during subsequent handling and operations. The pieces of carrier layer 99 are then placed on a flat work surface, such as a ferromagnetic table top, with each patch 11 facing upward.

The adhesive layer on a first side of each magnet 10 is exposed by peeling the backing layer away from each respective first side of the magnets 10. The exposed adhesive surface of each magnet 10 is then pressed against the upturned surface of a corresponding patch 11. The magnets are adhered as near as possible to the center of each patch 11, as shown in FIG. 13B. The adhesive on the surface of the first side of the magnets 10 contacts and adheres the magnets 10 to the exposed surfaces of the patches 11. This minimizes premature wear and tear of the patches 11 by deterring movement of the magnets 10 against the patches 11 after the patches 11 have been secured to the sleeve 80 around the magnet 10 in a subsequent operation.

Figure 13C:
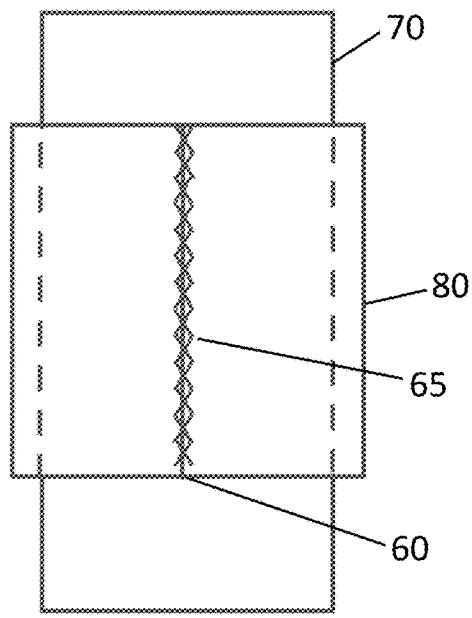
FIG. 13C is a top plan view of a flexible sleeve constructed in accordance with an embodiment of the present invention showing an elongated strip of heat resistant compressible padding received in and flattening the sleeve.
Figure 13D:
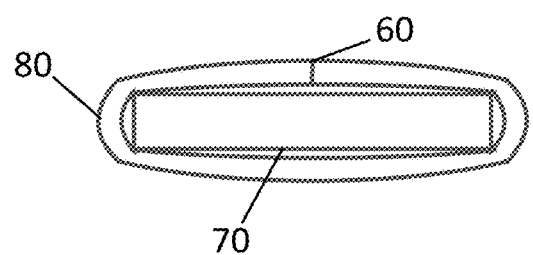
FIG. 13D is a sectional view of the flexible sleeve and padding of FIG. 13C.

An elongated strip of a heat resistant and highly compressible silicone padding 70 is obtained. The strip of silicone padding 70 is preferably thicker than the neoprene from which the sleeve 80 is formed. For example, the strip of silicone padding 70 can have a thickness of from about 0.5 inches to about 1.0 inches. The strip of silicone padding 70 has a length that greater than the diameter of the magnets 10. However, the length of the strip of silicone padding 70 can be from about 4.0 inches to about 24.0 inches, although lesser and greater lengths are viable. The strip of silicone padding 70 has a width that that is approximately the same as the width of the interior space 17 of the sleeve 80 when the sleeve 80 is flattened or compressed. For example, the strip of silicone padding 70 can have a width of about 3.0 inches. The strip of silicone padding 70 is inserted through one end of the sleeve 80 so that it rests in the interior space 17 of the sleeve 80 as illustrated in FIG. 13C and causes the sleeve to flatten as illustrated in FIG. 13D. This facilitates placement and adherence of the magnets 10 to the sleeve 80 as described below.

Figure 13E:
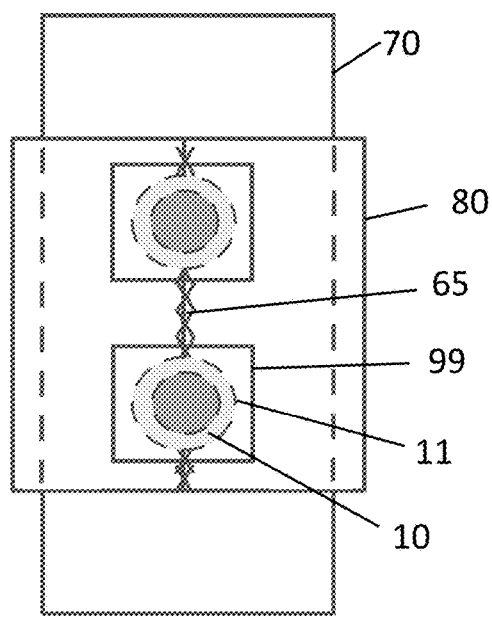
FIG. 13E is a top plan view of the flexible sleeve and padding of FIG. 13C showing a pair of magnets adhered to the exterior of the sleeve under a pair of carrier layer-backed heat transfer patches.
Figure 13F:
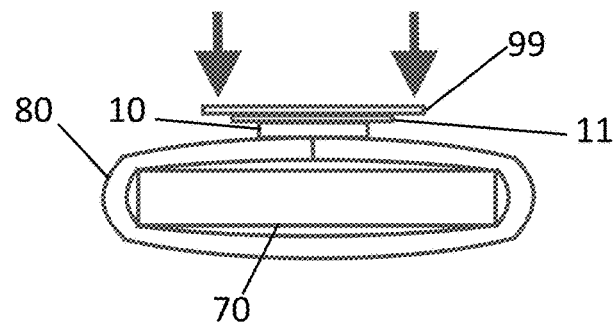
FIG. 13F is a sectional view of the objects of FIG. 13E.

The adhesive layer on the second side of each magnet 10 (i.e., opposite the first side) is exposed by peeling the backing layer away from each respective second side of the magnets 10 without removing the patch 11 and carrier layer 99 from the first side of each magnet 10. The adhesive-covered second side of each patch-backed magnet 10 is then placed where desired against the exterior surface of the sleeve 80 so that the patch 11 and carrier layer 99 cover the magnets 10 as shown in FIG. 13E. The magnets 10 and patches 11 can be placed over the seam 60 and stitching 65 as illustrated in FIGS. 13E and 13F, but in other embodiments, can be placed at other locations around the circumference of the sleeve 80 as explained above with reference to FIG. 10. Light pressure can be applied where indicated by arrows in FIG. 13F to cause the carrier layer 99 of each magnet patch 11 to contact and gently adhere to the surface of the sleeve 80 around the patch 11. As a result, the carrier layers 99 will hold the patches 11 and underlying magnets 10 in place on the sleeve 80 during subsequent handling and operations.

Figure 13G:
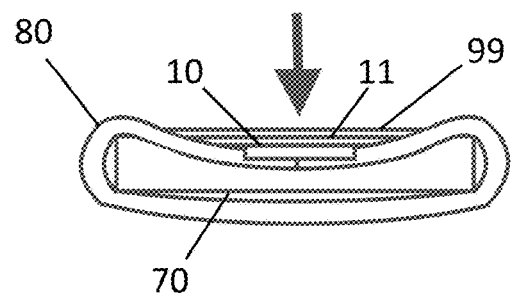
FIG. 13G is a sectional view of the objects of FIG. 13E showing the objects under a compressive force.

The entire assembly, including the sleeve 80 with magnet 10, patch 11, and carrier layer 99 adhered thereto, is then transferred to a heat press. Heat and pressure (i.e., a compressive force) are applied to the assembly for a period of time sufficient fuse the periphery of the heat transfer vinyl patches 11 to the sleeve 80 around the perimeter of the magnets 10. In some embodiments, the temperature of the heat applied to the assembly can be from about 295 degrees Fahrenheit to about 305 degrees Fahrenheit. In some embodiments, the amount of pressure applied to the assembly can be from about 5 PSI to about 50 PSI. In one embodiment, the amount of pressure applied to the assembly is about 20 PSI. In some embodiments, the period of time during which the heat and pressure is applied to the assembly can be from about 6 to about 20 seconds. However, it is to be understood that the variables of heat, pressure, and time can vary depending on the type of heat transfer vinyl used, the type of heat press used, and the thickness of the assembly. The presence of the strip of silicone padding 70 inside the sleeve 80 allows the magnets 10 and surrounding heat transfer patch material 11 to be embedded in the surface of the sleeve 80 upon application of heat and pressure to the upper exposed surface of the carrier layer 99, as shown in FIG. 13G (compressive force is indicated by an arrow). This allows the patches 11 to make a complete seal with the surface of the sleeve 80 around the magnets 10. Once the heat press cycle is complete and the pressure 3 removed, both the silicone padding 70 and the flexible sleeve 80 will rebound or expand to their original shapes, coordinately causing the magnet to stretch the patch 11 tightly over and around itself. The carrier layers 99 are then peeled off of the magnets 10 while the carrier layers 99 are still warm and pliable. The assembled magnetic object holder is then allowed to cool. Once cool, the magnetic object holder is ready for use.

Although embodiments of the present invention have been described in detail, it will be understood by those skilled in the art that various modifications can be made therein without departing from the spirit and scope of the invention as set forth in the appended claims. It should also be understood that although the invention has been described in the context of a device for holding and releasably attaching beverage containers to a ferromagnetic surface, the invention disclosed herein is not limited to use with beverage containers and can also be used to hold and releasably attach different types of containers and other objects, including various tools, utensils, and appliances, to a ferromagnetic surface. Examples of different objects which can be used with the magnetic object holder disclosed herein include aerosol cans, flashlights, spray bottles, jars, mobile electronic devices, wrenches, toothbrushes, razors, shampoo and conditioner bottles, as well as other elongated, cylindrical, or partially cylindrical objects, among others.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful MAGNETIC OBJECT HOLDER, it is not intended that such references be construed as limitations upon the scope of this invention except as set forth in the following claims.

What is claimed is:

1. A device for releasably attaching an object to a ferromagnetic surface, comprising:
a flexible sleeve defining an interior space in which the object is removably receivable, the sleeve formed from a sheet of flexible material having two opposing ends secured together along a seam by stitching such that the two opposing ends do not overlap;
at least one magnet secured to an external surface of the sleeve over a portion of the seam; and
a patch covering the at least one magnet and all of the stitching;
wherein the patch is fused to the sleeve around a perimeter of the at least one magnet; and
wherein the sleeve grips the object when the object is received in the interior space.

2. The device of claim 1, wherein the sleeve is a tubular or hollow cylindrical body.

3. The device of claim 1, wherein the sleeve has continuous interior and exterior surfaces.

4. The device of claim 1, wherein the sleeve has an annular cross section.

5. The device of claim 1, wherein the sleeve has an interior diameter that is less than an exterior diameter of the object such that the sleeve frictionally engages the object in an interference fit when the object is received in the interior space.

6. The device of claim 1, wherein:
the sleeve includes a first end and a second end; and
the object is removably receivable in the interior space through either the first or the second end.

7. The device of claim 1, wherein:
the sleeve includes a first end and a second end;
the object is removably receivable in the interior space through the first end; and
the second end includes a base portion configured to prevent the object from entering or exiting the interior space through the second end.

8. The device of claim 1, wherein an interior surface of the flexible sleeve frictionally engages an exterior surface of the object when the object is received in the interior space.

9. The device of claim 1, wherein the at least one magnet is a first magnet and a second magnet.

10. The device of claim 9, wherein:
the first magnet is secured to the sleeve over an upper portion of the seam; and
the second magnet secured to the sleeve over a lower portion of the seam.

11. The device of claim 1, further comprising:
a first adhesive layer on a first side of the at least one magnet in contact with the exterior surface of the sleeve; and
a second adhesive layer on a second side of the at least one magnet in contact with the patch.

12. A device for releasably attaching an object to a ferromagnetic surface, comprising:
a sheet of flexible material having two opposing ends secured together along a seam to form a tubular sleeve in which at least a portion of the object is removably receivable;
a first magnet secured to the sleeve over an upper portion of the seam;
a second magnet secured to the sleeve over a lower portion of the seam vertically spaced from the upper portion of the seam;
a patch secured to the sleeve around the first and second magnets so that the patch covers the first magnet, the second magnet, and substantially all of the seam;
wherein the sleeve grips the object when the object is received in the sleeve; and wherein the two opposing ends of the sheet of flexible material do not overlap.

13. The device of claim 12, wherein the first and second magnets are secured to an external surface of the sleeve.

14. The device of claim 12, wherein the two opposing ends of the sheet are stitched, bonded, or fused together.

15. The device of claim 12, wherein the two opposing ends of the sheet are stitched, bonded, or fused together.

16. The device of claim 12, further comprising:
   a first adhesive layer on a first side of each of the first and second magnets in contact with the exterior surface of the sleeve; and
   a second adhesive layer on a second side of each of the first and second magnets in contact with the patch.

17. A device for releasably attaching an object to a ferromagnetic surface, comprising:
   a sheet of flexible material having two opposing ends secured together along a seam to form a tubular sleeve in which at least a portion of the object is removably receivable, wherein the sleeve grips the object when the object is received in the sleeve;
   at least one magnet secured to an exterior surface of the sleeve;
   a patch fused to the sleeve around the at least one magnet so that the patch covers the at least one magnet and a portion of the seam;
   a first adhesive layer on a first side of the at least one magnet in contact with the exterior surface of the sleeve; and
   a second adhesive layer on a second side of the at least one magnet in contact with the patch.

18. The device of claim 17, wherein the first and second adhesive layers deter movement of the magnet against the exterior surface of the sleeve and the patch.

19. The device of claim 17, wherein the magnet is secured to the external surface of the sleeve over a portion of the seam.

20. The device of claim 17, wherein the two opposing ends of the sheet are stitched, bonded, or fused together.

21. The device of claim 17, wherein:
   the at least one is a first magnet and a second magnet;
   each of the first and second magnets are secured to the exterior surface of the sleeve by the patch; and
   the patch covers the first and second magnets and substantially all of the seam.

22. The device of claim 21, wherein:
   the first magnet is secured to the sleeve over an upper portion of the seam; and
   the second magnet secured to the sleeve over a lower portion of the seam.

* * * * *